United States Patent [19]
Steele

[11] Patent Number: 6,046,861
[45] Date of Patent: *Apr. 4, 2000

[54] ZOOM LENS SYSTEM HAVING IMAGING AND NON-IMAGING RANGES

[75] Inventor: Richard K. Steele, Lewisville, Tex.

[73] Assignee: Vari-Lite. Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/946,824

[22] Filed: Oct. 8, 1997

[51] Int. Cl.⁷ ............................. G02B 15/14; G02B 15/15
[52] U.S. Cl. ........................... 359/688; 359/677; 359/685
[58] Field of Search ................................. 359/688, 677, 359/685, 696; 353/101

[56] References Cited

U.S. PATENT DOCUMENTS

| | | | |
|---|---|---|---|
| 2,076,240 | 4/1937 | Levy | 362/281 |
| 2,114,963 | 4/1938 | Levy | 362/282 |
| 2,650,292 | 8/1953 | Strong | 362/268 |
| 2,909,652 | 10/1959 | Pratt | 362/294 |
| 2,950,382 | 8/1960 | Hatch | 362/281 |
| 3,192,829 | 7/1965 | Yamaji | 350/427 |
| 3,267,803 | 8/1966 | Macher et al. | 350/427 |
| 3,594,566 | 7/1971 | Kneisley | 240/3 |
| 3,975,089 | 8/1976 | Betensky . | |
| 4,009,942 | 3/1977 | Hirose | 350/422 |
| 4,063,800 | 12/1977 | Iizuka et al. | 350/184 |
| 4,101,957 | 7/1978 | Chang | 362/268 |
| 4,118,108 | 10/1978 | Muszumanski | 350/184 |
| 4,232,359 | 11/1980 | Leon et al. | 362/268 |
| 4,338,654 | 7/1982 | Logothetis | 362/268 |
| 4,392,187 | 7/1983 | Bornhorst | 362/233 |
| 4,462,067 | 7/1984 | Altman | 362/268 |
| 4,519,020 | 5/1985 | Little | 362/268 |
| 4,576,445 | 3/1986 | Inadome . | |
| 4,624,536 | 11/1986 | Nakagawa | 350/423 |
| 4,739,456 | 4/1988 | Little | 362/268 |
| 4,745,531 | 5/1988 | Leclerq | 362/281 |
| 4,779,176 | 10/1988 | Bornhorst | 362/223 |
| 4,828,372 | 5/1989 | Betensky | 350/427 |
| 4,980,806 | 12/1990 | Taylor et al. | 362/85 |
| 5,029,992 | 7/1991 | Richardson . | |
| 5,136,431 | 8/1992 | Teresawa et al. . | |
| 5,223,979 | 6/1993 | Yoneyama | 359/676 |
| 5,282,089 | 1/1994 | Abe | 359/688 |
| 5,282,121 | 1/1994 | Bornhorst et al. | 362/294 |
| 5,283,599 | 2/1994 | Tejima et al. | 353/30 |
| 5,295,056 | 3/1994 | Peck | 362/267 |
| 5,404,283 | 4/1995 | Yantz et al. | 362/267 |
| 5,579,172 | 11/1996 | Aoki et al. | 359/688 |
| 5,583,700 | 12/1996 | Usui et al. | 359/688 |
| 5,606,459 | 2/1997 | Nakatsuji . | |
| 5,717,526 | 2/1998 | Ohtake | 359/683 |

*Primary Examiner*—Georgia Epps
*Assistant Examiner*—Michael A Lucas
*Attorney, Agent, or Firm*—David H. Judson

[57] ABSTRACT

A projection zoom lens system is used in imaging and non-imaging modes for entertainment and architectural illumination, providing 8:1 zoom ratio in an imaging mode and 20:1 zoom ratio in a non-imaging mode. When coupled with a variable aperture iris, beam size control is obtained with 120:1 ratio. The lens system comprises four lens groups: a first group having a positive refractive power, a second group having a negative refractive power, a third group having a negative refractive power, and a fourth group having a positive refractive power. In the imaging mode, the third group is adjusted axially to vary magnification while the second group is adjusted axially to focus on the object. In the non-imaging mode, the second and third groups are brought into close proximity with each other and adjusted axially as a unit to vary magnification. The fourth group remains fixed and the first group can be adjusted axially to focus the image at different throw lengths.

16 Claims, 15 Drawing Sheets

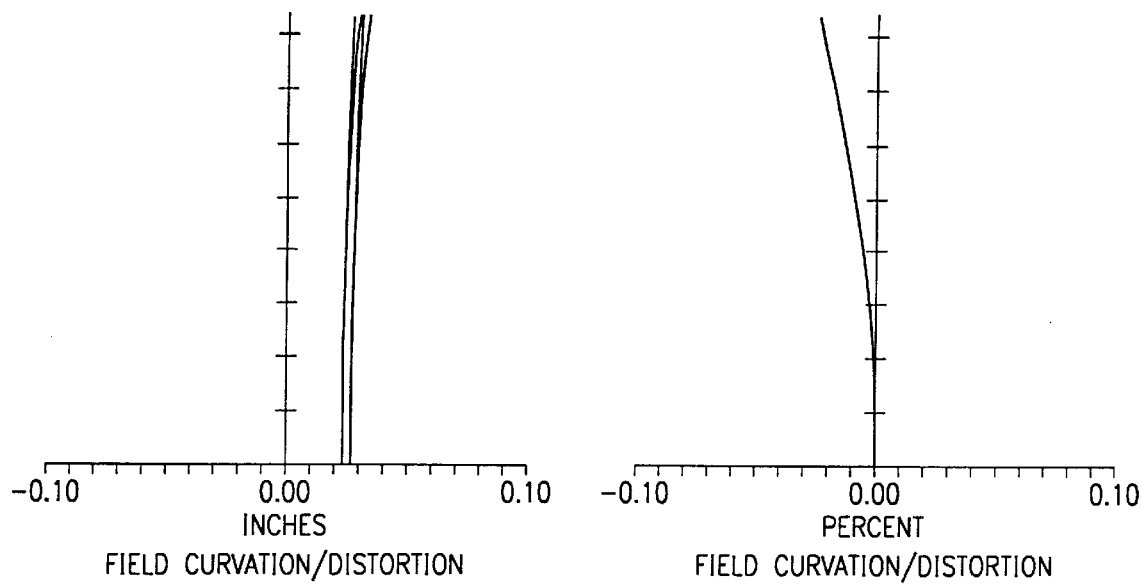
FIG. 2A
FIG. 2B
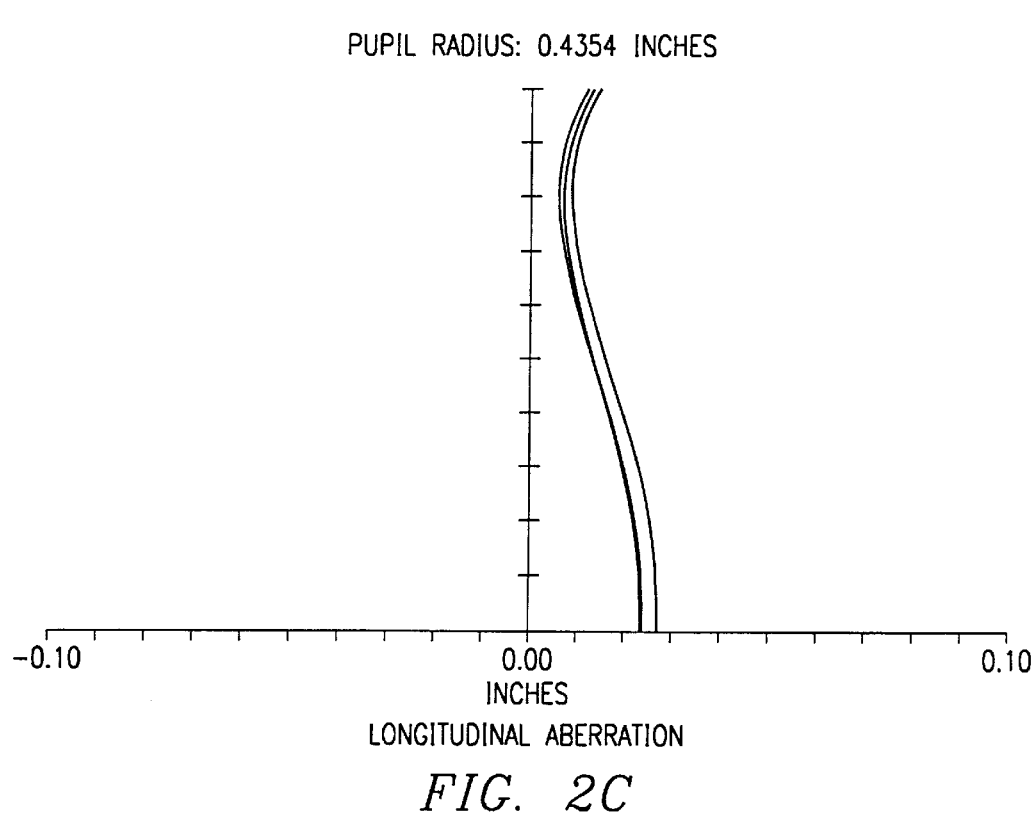
FIG. 2C

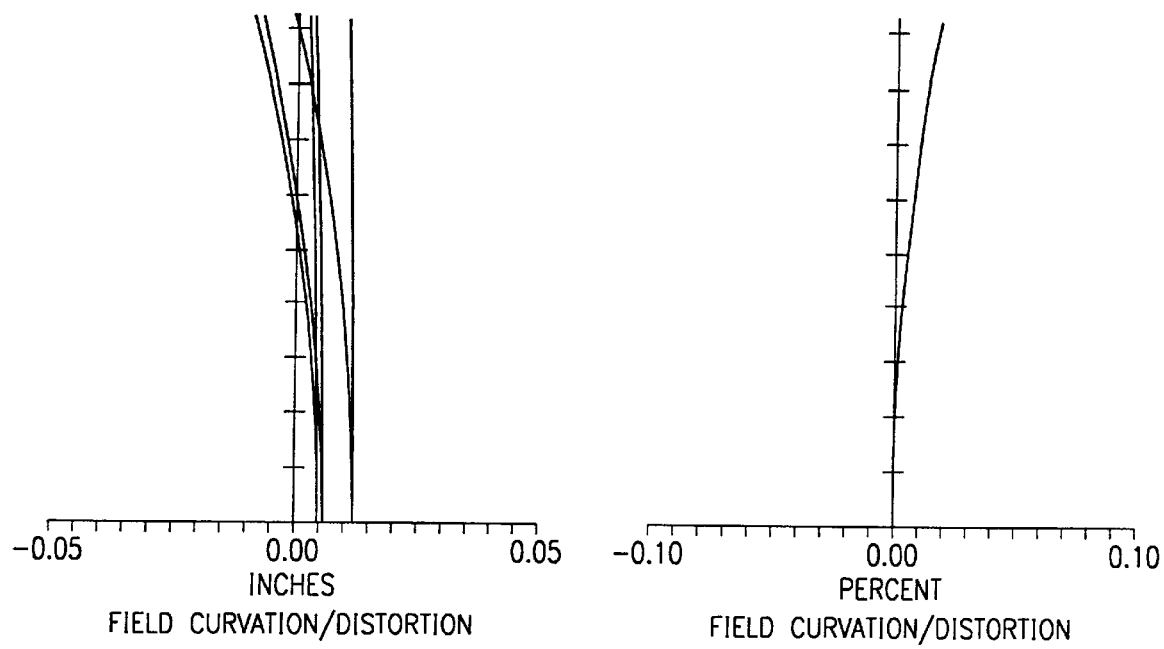
FIG. 3A
FIG. 3B
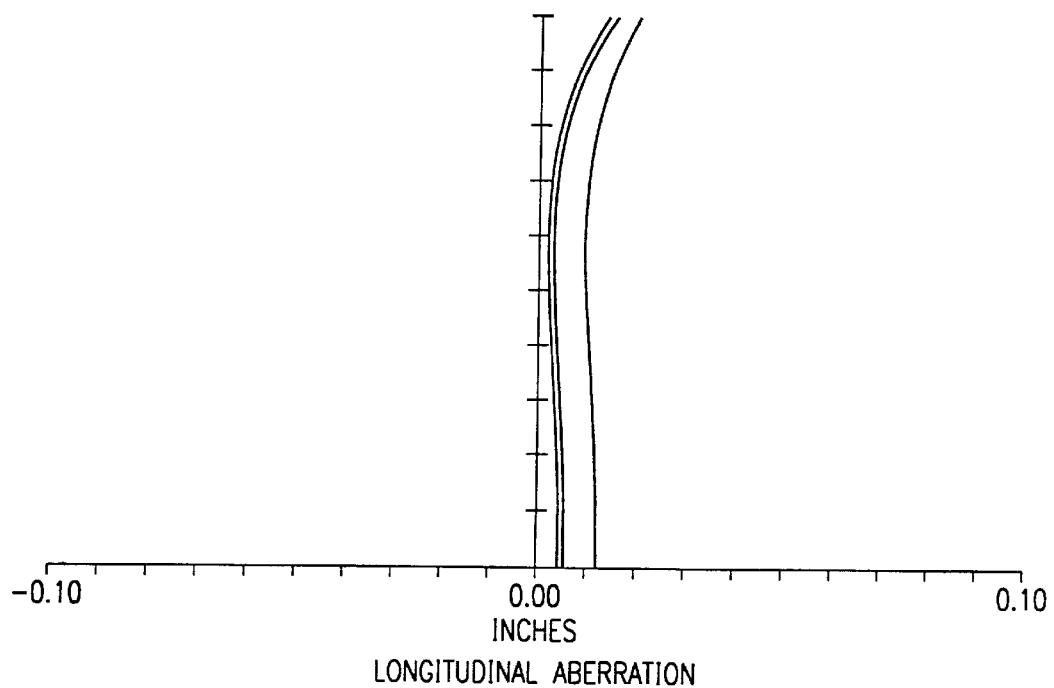
FIG. 3C

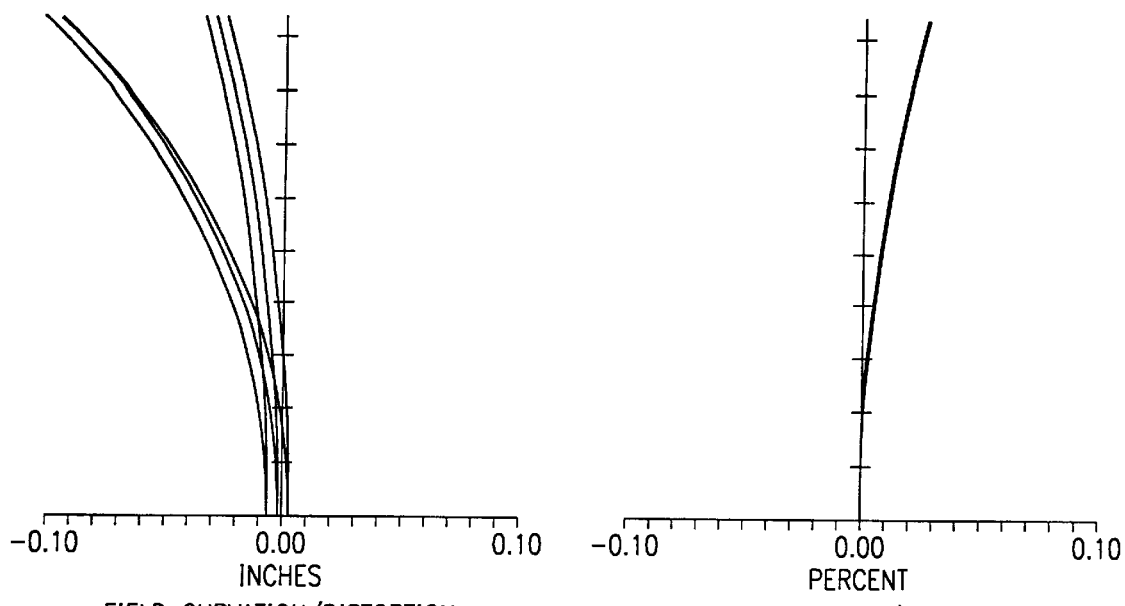
FIG. 4A
FIG. 4B
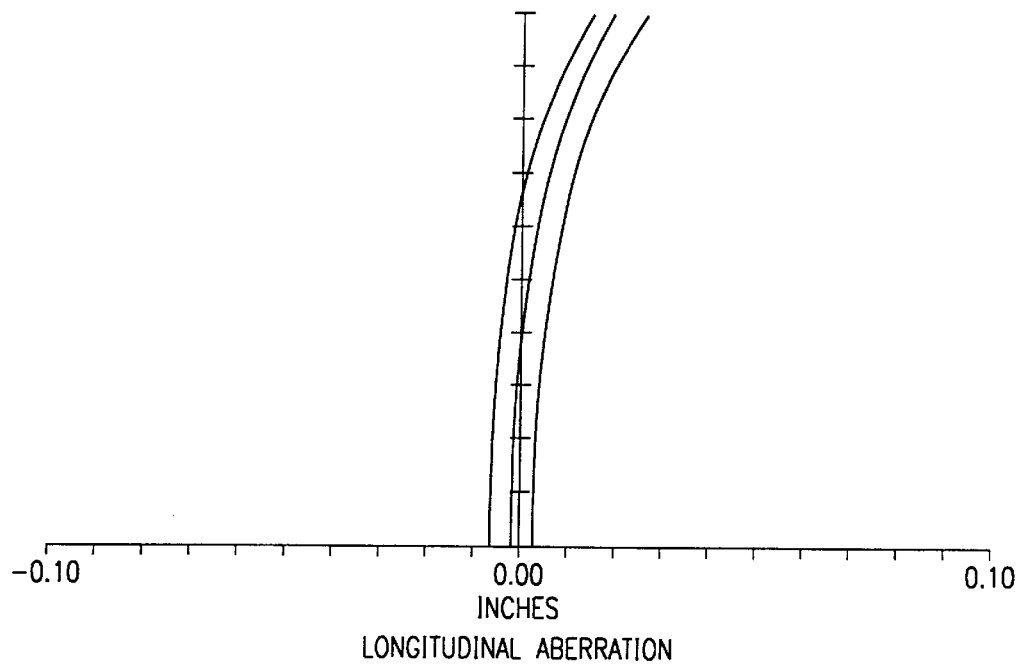
FIG. 4C

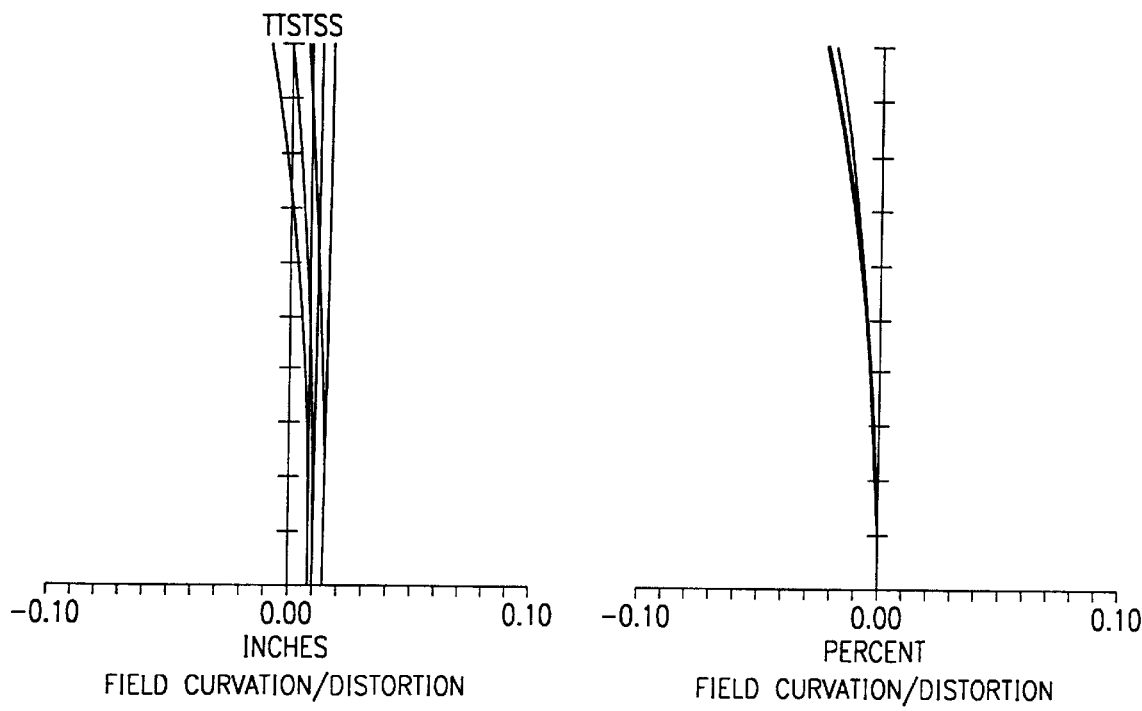
FIG. 6A
FIG. 6B
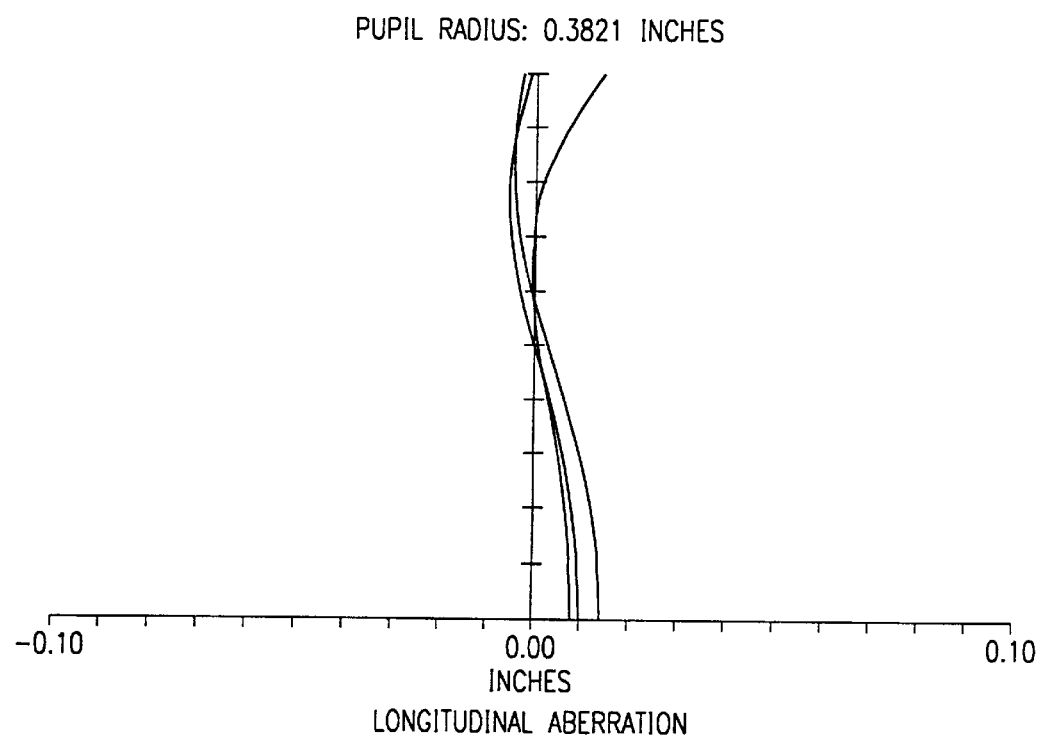
FIG. 6C

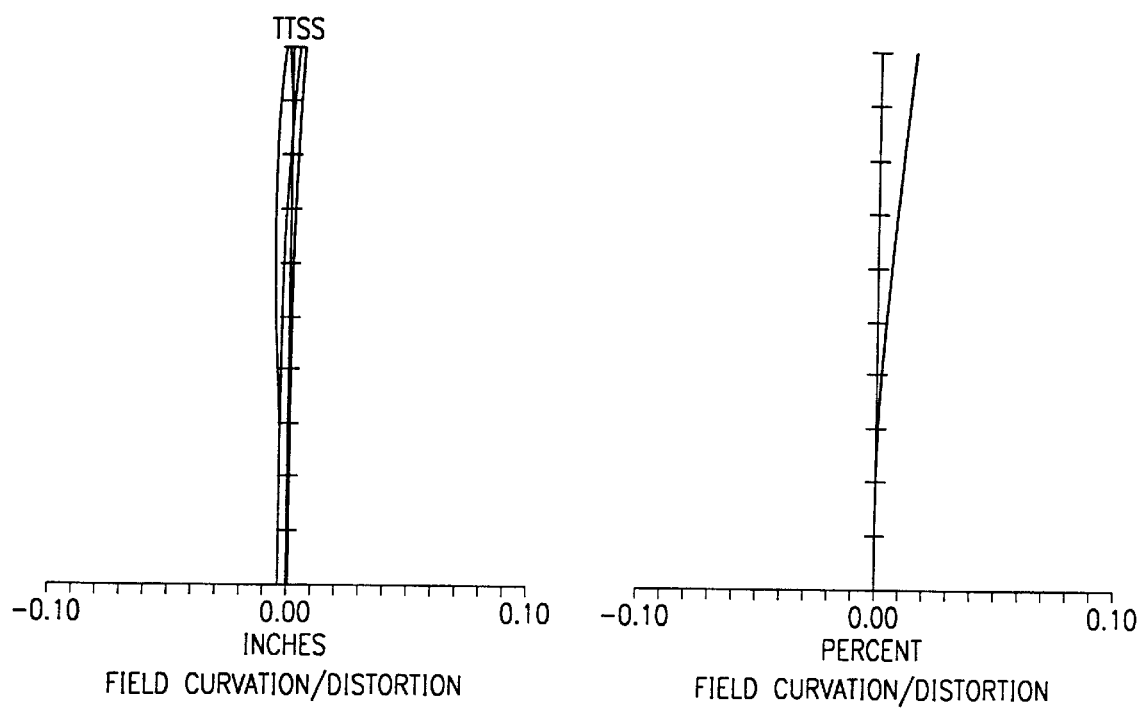
FIG. 7A — FIELD CURVATION/DISTORTION (INCHES)
FIG. 7B — FIELD CURVATION/DISTORTION (PERCENT)
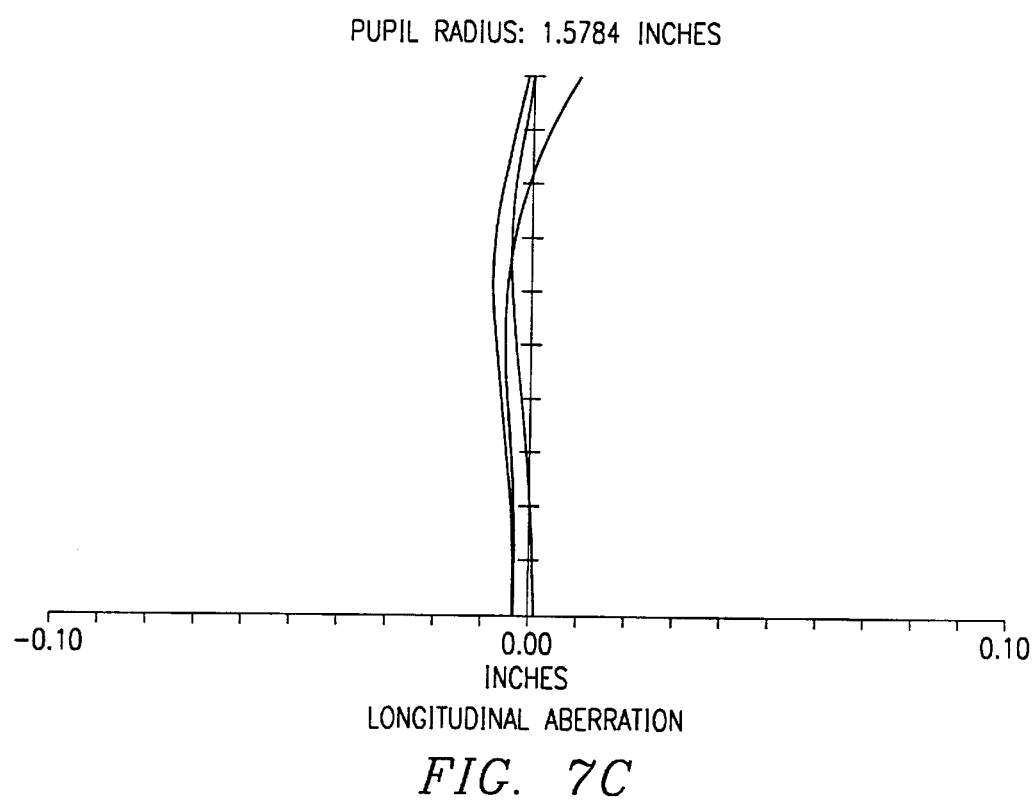
FIG. 7C — LONGITUDINAL ABERRATION (INCHES), PUPIL RADIUS: 1.5784 INCHES

ZOOM LENS SYSTEM HAVING IMAGING AND NON-IMAGING RANGES

FIELD OF THE INVENTION

The present invention relates to stage lighting instruments having variable magnification (zoom) lenses, and particularly to a zoom lens system operable over imaging and non-imaging ranges.

BACKGROUND OF THE INVENTION

Stage lighting instruments and other similar luminaries are used to provide controllable illumination of persons and/or objects. Among the controllable parameters are beam size and intensity of a light beam used for illumination. Another controllable parameter is the optical focus of a field stop, aperture, or image pattern generator used in a spot light or image projector. Two ways of controlling beam size include the use of an iris diaphragm having an aperture of adjustable diameter, and the use of a zoom lens system having variable magnification power. A beam size iris controls beam diameter by acting as a field stop having an aperture of adjustable diameter, and varies the size of the beam by cutting off light rays which do not pass through the aperture thereby decreasing the total amount of light which reaches the illuminated area. A zoom lens system controls beam diameter by changing the divergence angle of a bundle of light rays entering the lens system thereby concentrating or deconcentrating the light beam such that the total amount of light reaching the illuminated area is not changed. A zoom lens, therefore, varies the energy density in a projected spot of light as the diameter of the spot is varied, while a beam size iris varies the diameter of the projected spot without altering the energy density thereof.

Two-lens systems (two groups of lenses, each group having one lens) afford variable magnification and focus, such as those shown in U.S. Pat. No. 3,594,566 to Kneisley, and U.S. Pat. No. 4,519,020 to Little. A triplet system (three groups of lenses, one lens in each group) is disclosed in U.S. Pat. No. 5,029,992 to Richardson. Other lighting projectors featuring adjustable focus optical systems include U.S. Pat. Nos. 2,076,240 and 2,114,963 to Levy, U.S. Pat. No. 2,650, 292 to Strong, U.S. Pat. No. 2,909,652 to Pratt, U.S. Pat. No. 2,950,382 to Hatch, U.S. Pat. No. 4,101,957 to Chang, U.S. Pat. No. 4,232,359 to Leon, U.S. Pat. No. 4,338,654 to Logothetis, U.S. Pat. No. 4,462,067 to Altman, U.S. Pat. No. 4,739,456 to Little, U.S. Pat. No. 5,2295,056 to Peck, and U.S. Pat. No. 5,404,283 to Yantz et al. Examples of four group lens systems include U.S. Pat. Nos. 5,282,089; 5,223, 979; 5,579,172; 5,583,700; and 5,606,459.

As recognized by Tejima in U.S. Pat. No. 5,283,599, image projectors using a zoom lens as the projection lens must necessarily effect a zoom adjustment in which the focal position is kept constant, even if the zooming is carried out by the zoom lens system and a back focus adjustment is made to keep the image pattern generator coincident with the focal position obtained by the zoom adjustment. A typical system utilizing five lens groups disclosed in U.S. Pat. No. 3,192,829 to Yamaji maintains focus over a wide range of magnifications by moving three of the lens groups with respect to the remaining two fixed lens groups. Some other zoom lens systems designed for projection applications are disclosed in U.S. Pat. No. 3,267,803 to Macher and Klemt, U.S. Pat. No. 4,063,800 to Iizuka et al, and U.S. Pat, No. 4,118,108 to Muszumanski. However, the restriction in the above references that the image be focusable throughout the range of variable magnification tends to limit the range of magnification available from a particular zoom lens design.

The development of high quality projection lens systems having variable magnification has, for some time, been impeded by limitations as to cost, size, and particularly the overall length of the lens system. Whereas generally the ratio of overall length (from the front edge of front lens to the back edge of back lens) to longest focal length is usually 1.5× or greater, it has become desirable to develop a very short zoom lens system approaching 1.0× length and having about an 8:1 range of magnification change (zoom ratio), which can be produced inexpensively and withstand the rigors of high power density and portability.

SUMMARY OF THE INVENTION

An embodiment of the present invention provides a zoom lens for a stage lighting instrument, the lens operating over a certain range of magnification in which an image can be projected in focus, the lens further operating over another range in which the projected image is not focused, thereby providing a lens system effecting variable magnification in a spot light operating mode and effecting variable beam divergence in a wash light operating mode.

In an embodiment of the present invention, a zoom lens is provided having an 8:1 range of magnification in which a projected image can be focused, i.e. be disposed within the depth of field of the object plane; the zoom lens also having a 20:1 range of magnification irrespective of image focus. The zoom lens system according to one aspect of the present invention comprises four groups of lens elements: a first group having a positive refractive power, a second group having a negative refractive power, a third group having a negative refractive power, and a fourth group having a positive refractive power. The zoom lens system according to one aspect of the present invention in an imaging mode (where the lighting instrument is projecting an image), movement of the second lens group (Group 2) controls focus while movement of the third lens group (Group 3) rapidly controls magnification and in a non-imaging mode, Group 2 and Group 3 are moved together in fixed relationship with each other to provide a much wider angle of beam divergence control.

In an aspect of practicing an embodiment of the present invention, in a stage lighting instrument having variable magnification optics, a method of operating said optics in which a zoom ratio of 8:1 is obtained and image focus is maintained, and in which a zoom ratio 20:1 is obtained and image focus is not maintained, comprising the steps of: maintaining axial position of a projection lens group throughout; moving an objective lens group with reset to said projection lens group to focus a light beam at a desired distance; moving a variator lens group with respect to an objective lens group to obtain a desired magnification power; moving a compensator lens group with respect to said variator lens group to obtain a desired image focus; and moving said compensator lens group in a fixed relationship with said variator lens group with respect to said objective lens to obtain a desired magnification power irrespective of image focus.

In an aspect of an embodiment of the present invention, a zoom lens system comprising: a first lens group having a positive refractive power, a second lens group having a negative refractive power, a third lens group having a negative refractive power, and a fourth lens group having a positive refractive power, said lens system satisfying the following conditions:

$$fm = \sqrt{FwFn}$$

$$0.38 < \frac{fi}{fm} < 0.71 \quad \text{(condition 1)}$$

$$-0.68 < \frac{fii}{fm} < -1.26 \quad \text{(condition 2)}$$

$$-0.37 < \frac{fiii}{fm} < -0.69 \quad \text{(condition 3)}$$

$$1.07 < \frac{fiv}{fm} < 1.98 \quad \text{(condition 4)}$$

where $fi$ is the effective focal length (efl) of said first lens group, $fii$ is the efl of said second group, $fiii$ is the efl of said third group, and $fiv$ is the efl of said fourth group, Fw is the efl of said lens system at a wide-angle, Fn is the efl of said lens system at a narrow angle, and $fm$ is a reference value as defined above with respect to magnification.

BRIEF DESCRIPTION OF THE DRAWINGS

FIG. 2a–2c are a set of graphs plotting aberration curves of a zoom lens according to a first embodiment at wide angle;

FIG. 3a–3c are a set of graphs plotting aberration curves of a zoom lens according to a first embodiment at medium angle;

FIG. 4a–4c are a set of graphs plotting aberration curves of a zoom lens according to a first embodiment at narrow angle;

FIG. 6a–6c are a set of graphs plotting aberration curves of a zoom lens according to a second embodiment at wide angle;

FIG. 7a–7c are a set of graphs plotting aberration curves of a zoom lens according to a second embodiment at medium angle;

DETAILED DESCRIPTION

Figure 1:
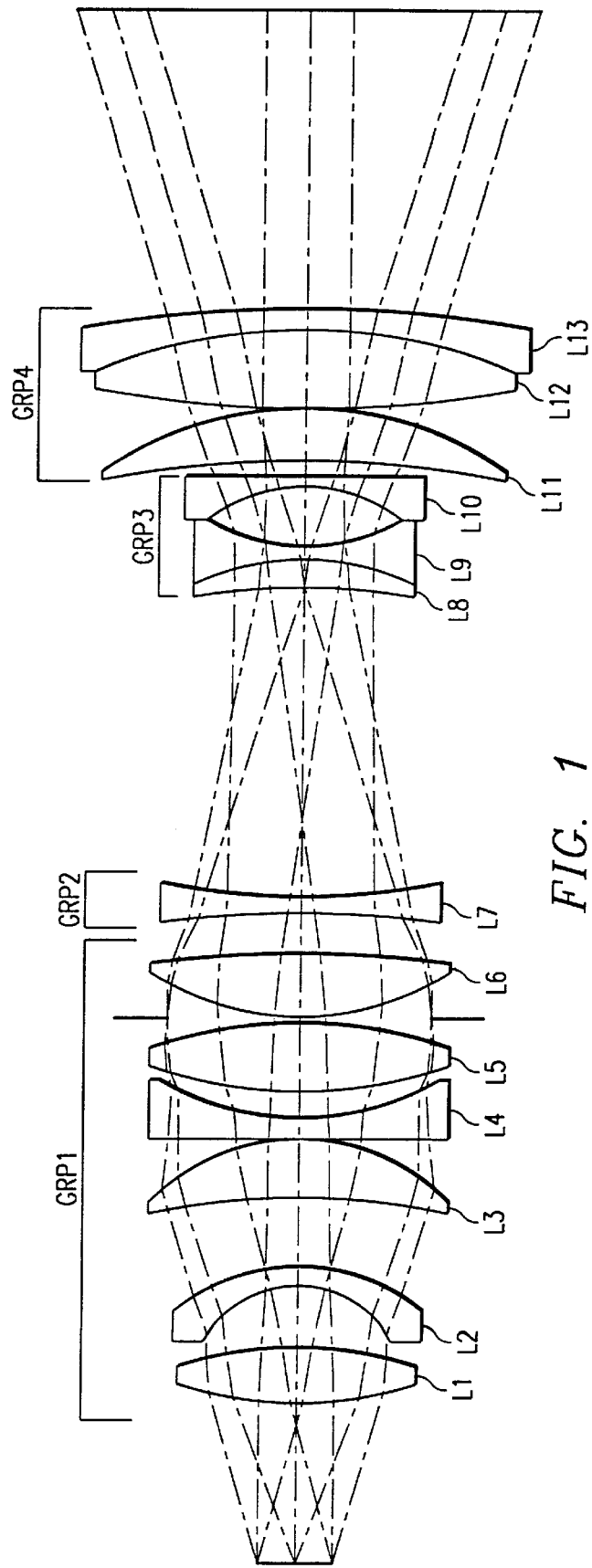
FIG. 1 is a cross-sectional view of a zoom lens system according to a first embodiment of the present invention.

In accordance with one aspect of the present invention, and as shown in FIG. 1, a zoom lens system preferably comprises 13 lens elements arranged in four groups. Group 1, an objective group, preferably comprises six lens elements L1–L6 and has a positive refractive power. Group 2, a compensator group, preferably comprises one lens element L7 and has a negative refractive power. Group 3, a variator group, preferably comprises three lens elements L8–L10 and has a negative refractive power. Group 4, a projection group, preferably comprises three lens elements L11–L13 and has a positive refractive power. The lens system operates in an imaging mode in which Group 3 moves linearly to vary magnification and Group 2 moves non-linearly to compensate for image shift. The lens system also operates in a non-imagining mode in which Group 3 is brought close to Group 2 and the two groups are moved together to vary beam divergence. The lens system uses routine optical glasses made of commonly available materials such as borosilicate, flint, dense flint and barium glasses and avoids the use of exotic and expensive materials such as Lanthinum crowns and flints.

Figure 9:
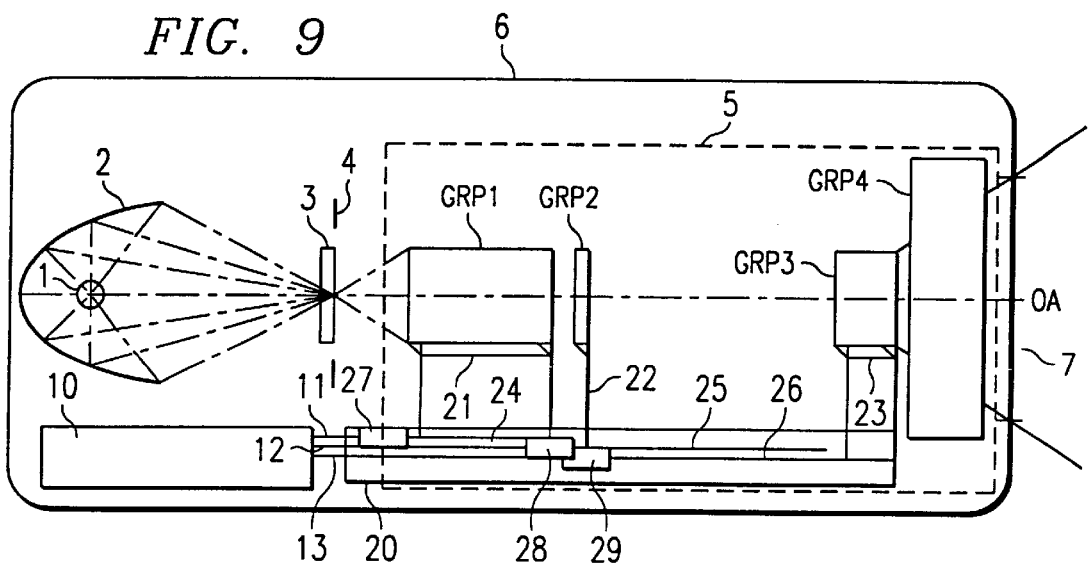
FIG. 9 is a schematic side elevation of a lamp head assembly including a zoom lens system.
Figure 10:
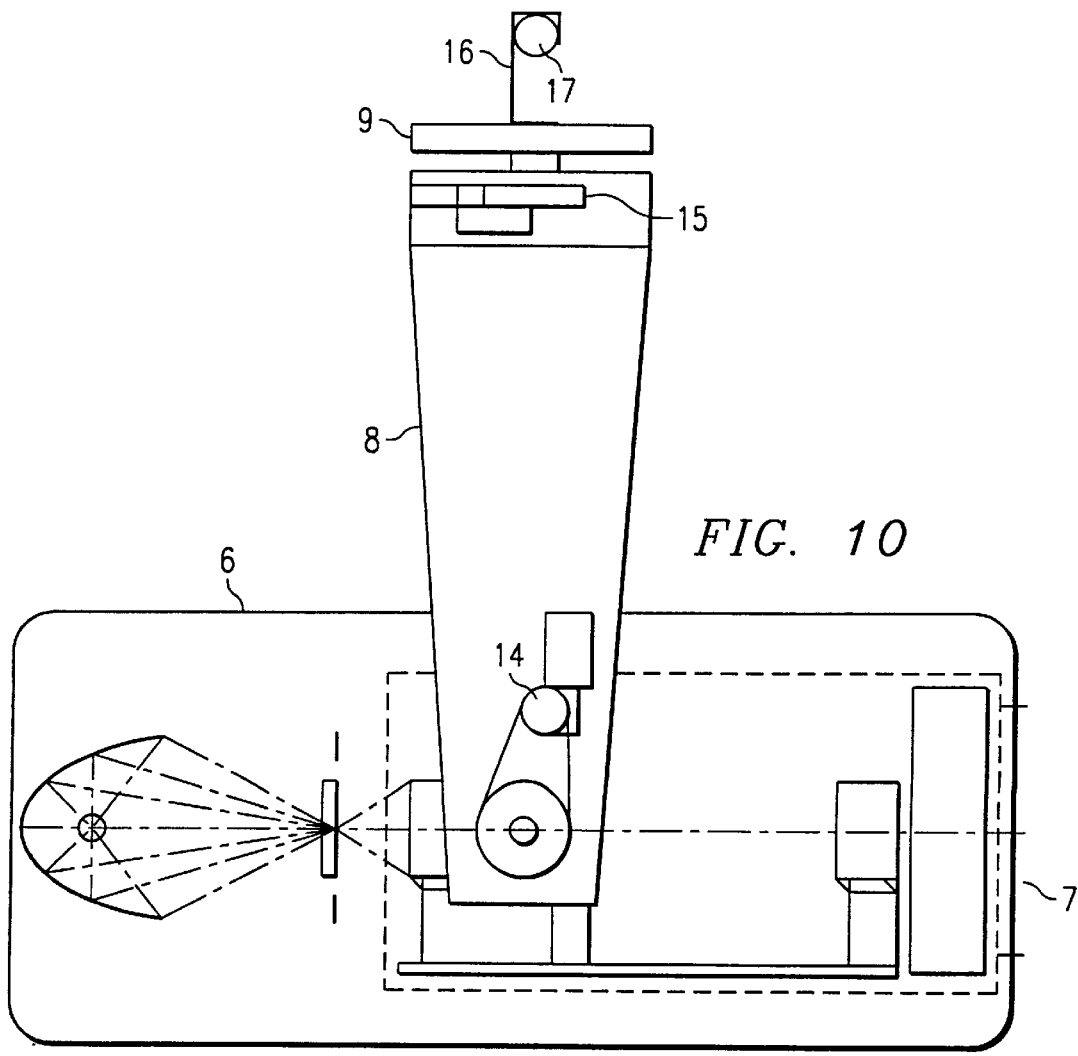
FIG. 10 is a schematic side elevation of a stage lighting instrument including a zoom lens system.

The lens system is mounted in a stage lighting instrument, as shown in FIG. 9 and FIG. 10, having a lamp 1 coupled with a reflector 2 to project a beam of light that illuminates an object 3, an image of which is projected by the lens system 5. The object may be a light pattern generator or gobo, such as the type disclosed in U.S. Pat. No. 4,779,176; or an electronic display device of the type disclosed in U.S. Pat. No. 5,282,121; or the object may be an iris diaphragm having a variable-diameter aperture such as disclosed in U.S. Pat. Nos. 3,594,566; 4,338,654; and 4,462,067. Of the lens system, Group 1 is located closest to the object and Group 4 is located farthest from the object.

The object 3 is disposed coincidently with optical axis OA and is generally coplanar with an object plane 4. The object plane is located at a back focal distance from the lens system 5. Lens Group 1 is supported by a motorized carriage assembly illustratively comprising supporting bracket 21 coupled to lead screw 24, which is driven by a reversible electric motor 27. Lens Group 2 is supported by a similar motorized carriage assembly illustratively comprising supporting bracket 22 coupled to lead screw 25, which is driven by a reversible electric motor 28. Lens Group 3 is supported by another motorized carriage assembly illustratively comprising supporting bracket 23 coupled to a lead screw 26, which is driven by reversible electric motor 29. The motors 27, 28, and 29 are controlled by an electronic controller 10 via control lines 11, 12, and 13. The controller 10 may comprise a local de-multiplexer circuit such as that shown in U.S. Pat. No. 4,392,187 (incorporated herein by reference). Alternatively, controller 10 may comprise a local processor-based circuit such as that shown in U.S. Pat. No. 4,980,806 (incorporated herein by reference).

Motors 27, 28 and 29 are preferably stepper motors controlled by a local processor type of controller including suitable motor drive circuits for energizing the motors. The controller preferably includes a look-up table stored in local memory, and includes a processor that, by referring to the look-up table, transforms input control signals representing desired magnification and focus into signals for energizing motors 27, 28 and/or 29 to position the lens groups properly.

Separate look-up tables may be provided in memory, the tables containing values representing lens group positions in an imaging mode and in a non-imaging mode. These tables are preferably down-loaded to a local processor system from a control console system, and thereafter maintained in local memory in a manner similar to the down-loading of local processor operating system as described in U.S. Pat. No. 4,980,806 mentioned above.

The lamp 1, reflector 2, object 3, lens system 5, controller 10, and motorized carriage apparatus 20 are enclosed within a housing having an exit aperture 7. As shown in FIG. 10, the lamp head housing 6, is mounted for rotation within a yoke assembly 8. The yoke assembly 8 is mounted for rotation about a mounting tube 9. The mounting tube 9, includes a hook 16 for attachment to a pipe 17. Rotation of the lamp head housing 6 is effected by a motor drive assembly 14 mounted in the yoke, while rotation of the yoke assembly 8 is effected by a motor drive assembly 15, also mounted in the yoke. Preferably the exit aperture 7 of the lamp head housing 6 is filled with the last lens element L13 of lens Group 4.

The lens system is operable, in an imaging mode, to project an image of the illuminated object located in an object plane at a back focal distance behind lens element L1. The Group 4 may be fixed in axal position at the nose of a stage lighting instrument, with the remaining groups mounted in axially-translatable mounts coupled to motorized drives for adjusting the axial positions of those groups. In particular, Group 3 may be adjusted to vary the magnification power of the lens system over a wide range e.g. about 8:1, while Group 2 may be adjusted to focus the lens system on the object. The overall length of the lens system as shown in FIGS. 1 and 9 is approximately 11.1 inches and the focal length of the system is preferably adjustable from about 1.251 inches at wide angle (shortest focal length) to about 10.00 inches at narrow angle (longest focal length), yielding a ratio of overall length to longest focal length of 11.1/10.0=1.11×, and a ratio of longest focal length to shortest focal length about of 7.9936:1 (zoom ratio=8:1).

The prescription for a first embodiment of the lens system is given in Table 1, in which the values for F, R and D are in inches.

TABLE 1

First Embodiment

| F = 1.251 | NA = 0.36 | 2w = 38 degrees | D0 = 1.500 | |
|---|---|---|---|---|
| R1 = 3.7755 | D1 = 0.565 | N1 = 1.6204 | V1 = 60.32 | L1 |
| R2 = −3.7755 | D2 = 0.586 | | | |
| R3 = −1.1235 | D3 = 0.200 | N2 = 1.6200 | V2 = 36.37 | L2 |
| R4 = −1.9667 | D4 = 0.684 | | | |
| R5 = −8.0411 | D5 = 0.588 | N3 = 1.6204 | V3 = 60.32 | L3 |
| R6 = −2.097 | D6 = 0.020 | | | |
| R7 = Infinity | D7 = 0.200 | N4 = 1.7174 | V4 = 29.51 | L4 |
| R8 = 2.790 | D8 = 0.265 | | | |
| R9 = 4.618 | D9 = 0.677 | N5 = 1.6204 | V5 = 60.32 | L5 |
| R10 = −4.618 | D10 = 0.084 | | | |
| R11 = 2.685 | D11 = 0.643 | N6 = 1.5638 | V6 = 60.80 | L6 |
| R12 = −11.949 | D12 = Variable | | | |
| R13 = −9.784 | D13 = 0.150 | N7 = 1.5488 | V7 = 45.41 | L7 |
| R14 = 5.966 | D14 = Variable | | | |
| R15 = −6.561 | D15 = 0.300 | N8 = 1.6204 | V8 = 36.37 | L8 |
| R16 = −2.338 | D16 = 0.125 | N9 = 1.5488 | V9 = 45.41 | L9 |
| R17 = 1.900 | D17 = 0.611 | | | |
| R18 = −1.652 | D18 = 0.125 | N10 = 1.5481 | V10 = 45.75 | L10 |
| R19 = −23.000 | D19 = Variable | | | |
| R20 = −10.451 | D20 = 0.499 | N11 = 1.6204 | V11 = 60.32 | L11 |
| R21 = −3.668 | D21 = 0.021 | | | |

TABLE 1-continued

First Embodiment

| F = 1.251 | NA = 0.36 | 2w = 38 degrees | D0 = 1.500 | |
|---|---|---|---|---|
| R22 = 11.114 | D22 = 0.800 | N12 = 1.5231 | V12 = 58.57 | L12 |
| R23 = −5.256 | D23 = 0.220 | N13 = 1.7174 | V13 = 29.51 | L13 |
| R24 = −12.878 | D24 = 240.0 | | | |

| Focal Length | 1.251 | 2.50 | 5.00 | 10.00 | (Imaging mode) |
|---|---|---|---|---|---|
| Variable D12 | 0.136 | 1.537 | 1.022 | 0.050 | |
| Variable D14 | 3.193 | 1.298 | 0.223 | 0.575 | |
| Variable D19 | 0.411 | 0.905 | 2.495 | 3.113 | |

| Focal Length | 0.989 | 2.256 | 5.0261 | 10.452 | (Non-imaging mode) |
|---|---|---|---|---|---|
| Variable D12 | 3.4036 | 2.004 | 1.045 | 0.050 | |
| Variable D14 | 0.200 | 0.2000 | 0.200 | 0.200 | |
| Variable D19 | 0.1364 | 1.5365 | 2.4949 | 3.113 | |

F is the focal length. NA is the numerical aperture (tangent of the half angle for the marginal axial ray which is on the object side). 2w is the total field angle. D0 is the distance from the object to be projected to the first surface (leftmost in the Figures) of the most upstream lens.

The N values are the respective indices of the refraction of each lens and the V numbers are the Abbe numbers for each lens. The listed R numbers represent the radii of the respective front and back surfaces of each lens; the D numbers represent the respective distances from one lens surface to the next downstream lens surface with D24 representing the distance from the most downstream lens surface to the surface to be illuminated, i.e. the throw length.

Note that for the imaging mode case illustrated above, the distance D24 represents 20 feet from the nose of the luminaire to the surface illuminated by the luminaire; for example, a projection screen. For a given throw length, represented by D24, the relative positions of Group 1 and Group 4, and thus the distance D0 from the object plane to the first surface of lens L1 (radius R1), remain constant. If the luminaire is redirected towards another surface to be illuminated, at a different throw length, the value of D24 will have changed and the value of D0 must also change thereby requiring adjustment of Group 1 since Group 4 is fixed in the nose of the luminaire.

Figure 13A:
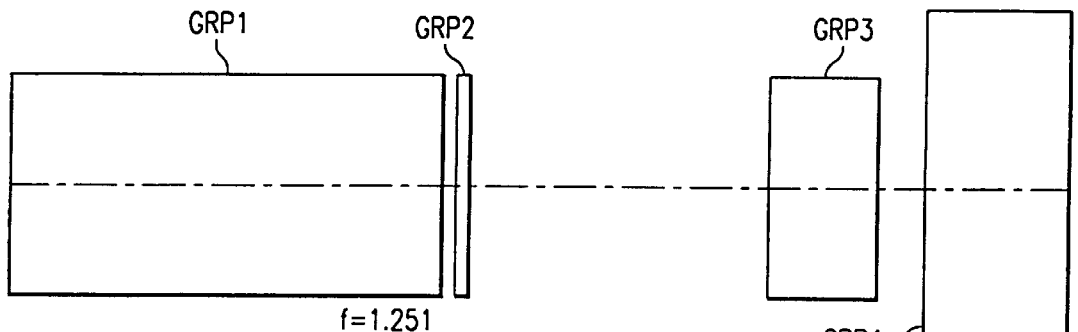
FIG. 13A–13D illustrate the relative positions of the lens groups according to a first embodiment of the present invention in an imagining mode.
Figure 13B:
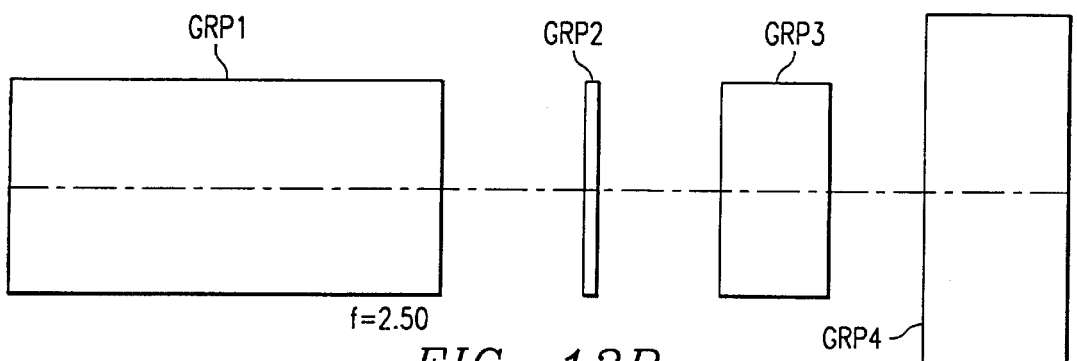
Figure 13C:
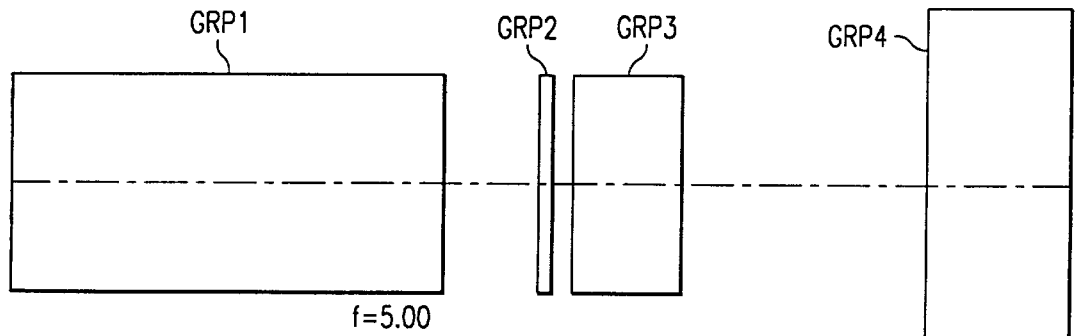
Figure 13D:
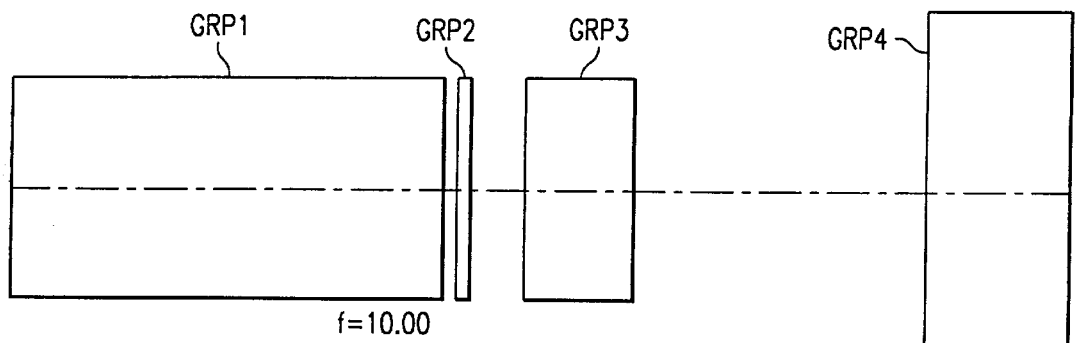

As shown in FIGS. 13A–13D, the zoom lens system in the imaging mode holds Group 1 in fixed relationship with Group 4 throughout the range of focal lengths (f/1.251 through f/10.00). Group 3 moves linearly, being closest to Group 4 at wide-angle (FIG. 13A), moving towards Group 1 at intermediate angles (FIGS. 13B and 13C) and being closest to Group 1 at narrow angle (FIG. 13D).

In a non-imaging mode, and as shown in FIGS. 14A–14D, variable D14 is made small such that lens Group 3 is brought close to Group 2, and then Group 2 and Group 3 are moved as a unit to vary beam divergence over a 20:1 ratio although image focus cannot be maintained at all angles. This provides a very wide range of beam divergence angles for wash light applications in which a wide range of beam angle adjustment is desired but image projection is not a requirement.

Figure 14A:
FIG. 14A–14D illustrate the relative positions of the lens groups according to a first embodiment of the present invention in a non-imaging mode.
Figure 14B:
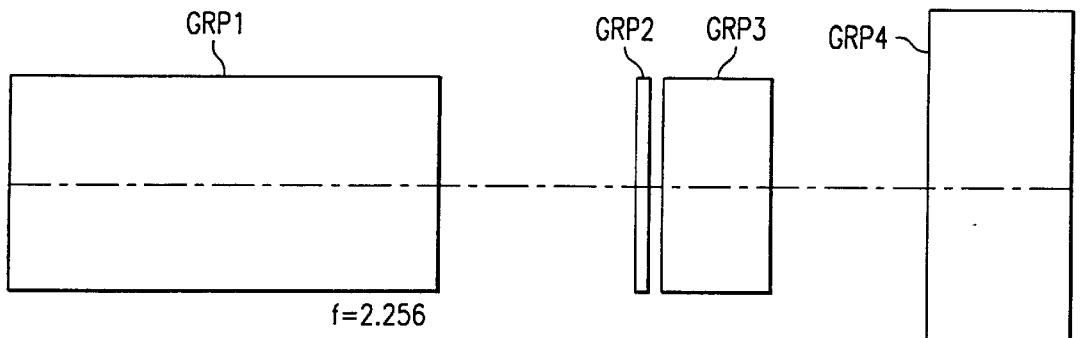
Figure 14C:
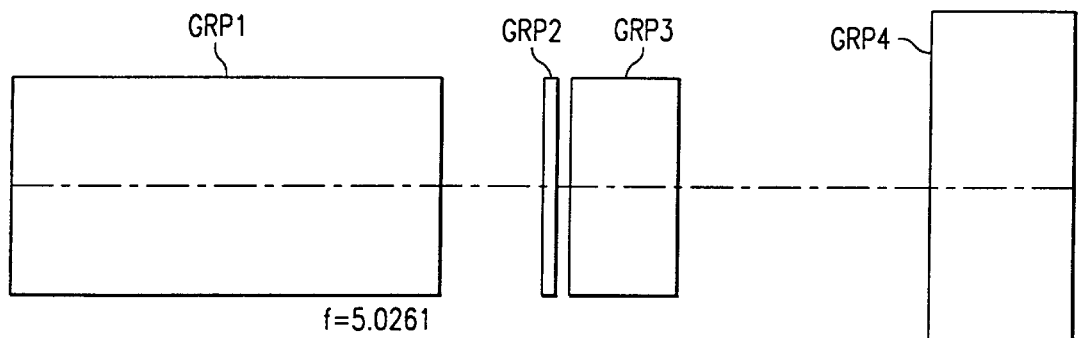
Figure 14D:
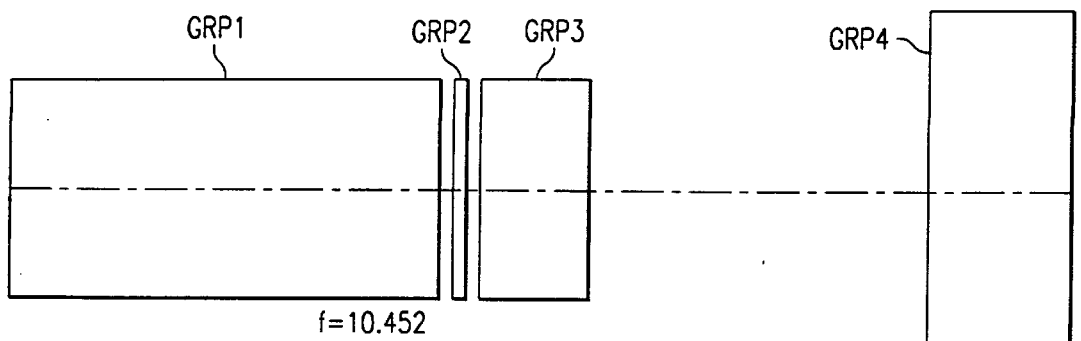

As shown in FIG. 14A, Group 2 and Group 3 are closest to Group 4 at wide angle. As shown in FIGS. 14B and 14C, Group 2 and Group 3 maintain their relative separation and move as a unit towards Group 1 to decrease the angle of beam divergence. As shown in FIG. 14D, Group 2 and Group 3 are closest to Group 1 at narrow angle, and still maintain the same relative separation.

If the object is an iris diaphragm having a variable aperture, varying from 0.9 inches to 0.100 inches for example, having a ratio of largest aperture to smallest aperture of 9:1, then the lens system coupled with the variable-aperture iris is capable of beam angle adjustments over a range of 9×20=180; a combined ratio of 180:1 in a non-imaging mode. The variable aperture is effective to vignette a beam illuminating the aperture and produces a small spot of light projected by the lens system to an appreciable distance (20 feet or more). At that distance, the spot of light is small enough that any fuzziness at the edge thereof is not distinguishable by a member of an audience so the problem of maintaining focus in the non-imaging mode is minimized.

When the lens system of the first embodiment is focused at a throw length of 20 feet, the systems yields high optical performance exhibiting aberration characteristics illustrated in FIGS. 2–4. FIGS. 2a and 2b show aberration curves for the first embodiment zoom lens system at wide angle. FIG. 3a and 3b show aberration curves for the first embodiment zoom lens system at medium angle. FIG. 4a and 4b show aberration curves for the first embodiment zoom lens system at narrow angle.

While the first embodiment lens system according to the present invention yields good optical performance with respect to imagery, provides a wide zoom ratio, as is physically short compared to its longest focal length, the system still contains three pounds of glass (considering that lens L13 is 4.5 inches in diameter in this particular stage lighting application) with two-thirds of that mass being located in Group 4 at the forward end of the luminaire. In a zoom lens system for an automated, pan & tilt luminaire, it is desirable to minimize the mass located at the extremes of the lamp head structure so as to minimize the inertial load on the pan and tilt motors. Therefore, a second embodiment lens system according to the present invention is hereafter disclosed.

Figure 5:
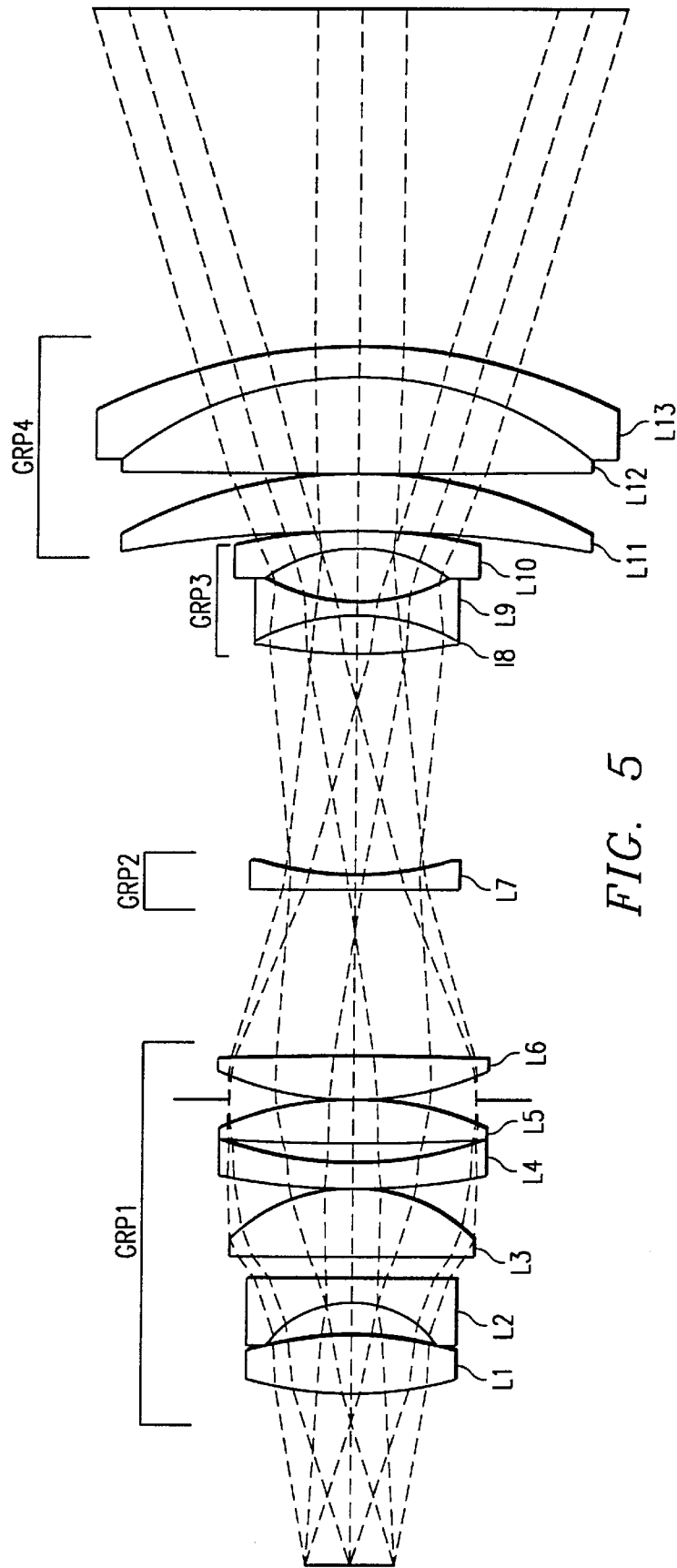
FIG. 5 is a cross-sectional view of a zoom lens system according to a second embodiment of the present invention.

In accordance with another aspect of the present invention, and as shown in FIG. 5, a second embodiment zoom lens system preferably comprises 13 lens elements arranged in four groups. Group 1, an objective group, preferably comprises six lens elements L1–L6 and has a positive refractive power. Group 2, a compensator group, preferably comprises one lens element L7 and has a negative refractive power. Group 3, a variator group, preferably comprises three lens elements L8–L10 and has a negative refractive power. Group 4, a projection group, preferably comprises three lens elements L11–L13 and has a positive refractive power. The lens grouping is the same as the first embodiment disclosed above, and the second embodiment lens system also uses routine optical glasses made of commonly available materials, avoiding the use of exotic and expensive materials.

Figure 11:
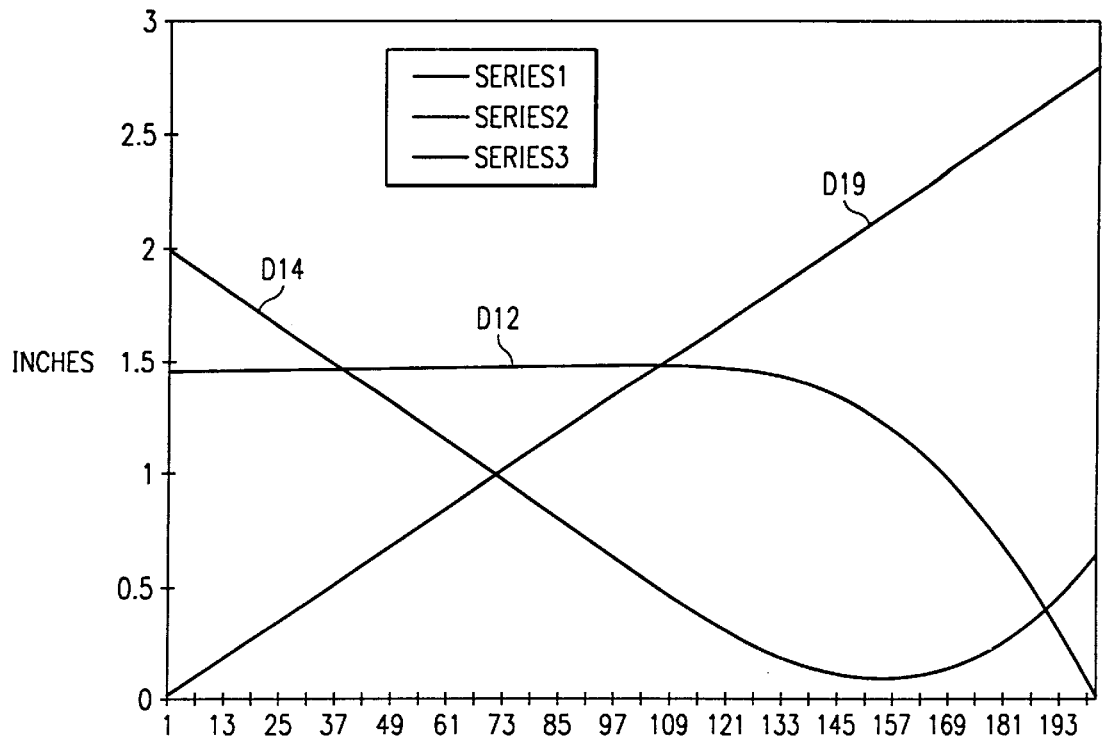
FIG. 11 is a graph plotting the variables D12, D14 and D19 at various angles of beam divergence according to a second embodiment in the imaging mode.

The second embodiment lens system is operable in an imaging mode and a non-imaging mode, with the lens groups mounted for axial movement as described above for the first embodiment lens system. The Group 4 lenses may be fixed in axial position at the nose of a stage lighting instrument, with the remaining groups mounted in axially-translatable mounts coupled to motorized drives for adjusting the axial positions of those groups. As in the first embodiment, Group 3 may be adjusted to vary the magnification power of the lens system over a wide range while Group 2 may be adjusted to focus the lens system on the object. The lens system operates in an imaging mode in which Group 3 moves linearly to vary magnification and Group 2 moves non-linearly to compensate for image shift as shown in FIGS. 16A–16D. The variable air spaces D12, D14, and D19 in the imaging mode are plotted in a graph shown in FIG. 11. Note that from the graph that the distance D19, representing the separation of Group 3 from Group 4, increases linearly from wide angle at the left of the graph to narrow angle at the right of the graph. Also note that the distance D14, representing the separation of Group 3 and Group 2, decreases from two inches at wide angle to less than one-tenth inch and then begins to increase again approaching narrow angle; thereby exhibiting non-linear motion.

Figure 12:
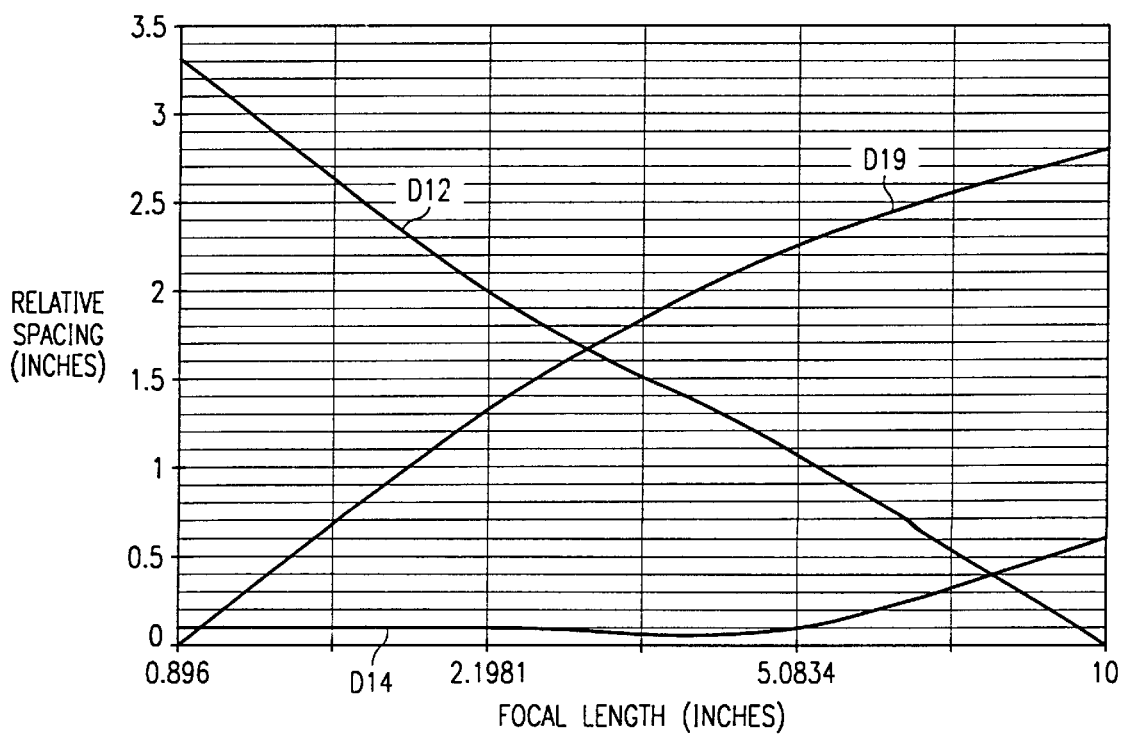
FIG. 12 is a graph plotting the variables D12, D14, and D19 at various focal lengths according to a second embodiment in the non-imaging mode.

The lens system also operates in a non-imaging mode in which Group 3 is brought close to Group 2 and the two groups are moved together to vary beam divergence as shown in FIGS. 17A–17D. The variable air spaces D12, D14, and D19 in the non-imaging mode are plotted in a graph shown in FIG. 12. Note from the graph that the distance D19 representing the separation of Group 3 from Group 4 increases from wide angle at the left of the graph to narrow angle at the right of the graph, while the distance D14, representing the separation of Group 2 from Group 3 remains small and constant throughout most of the range of adjustment, but varies somewhat towards wide angle.

The overall length of the lens system is approximately 9.2 inches and the focal length of the system is adjustable from about 1.25 inches at wide angle to about 10.00 inches at narrow angle, yielding a ratio of overall length to longest focal length of about 9.2/10.0=0.92×, and a ratio of longest focal length to shortest focal length (zoom ratio) of about 8:1.

A prescription for the second embodiment of the lens system is given in Table 2, in which the values for R and D are again given in inches.

TABLE 2

Second Embodiment

| $F = 1.250$ | $NA = 0.31$ | $2w = 38$ degrees | $D0 = 1.500$ | |
|---|---|---|---|---|
| R1 = 3.2161 | D1 = 0.500 | N1 = 1.6204 | V1 = 60.32 | L1 |
| R2 = −3.2161 | D2 = 0.279 | | | |
| R3 = −0.9319 | D3 = 0.200 | N2 = 1.7618 | V2 = 26.53 | L2 |
| R4 = Infinity | D4 = 0.188 | | | |
| R5 = Infinity | D5 = 0.600 | N3 = 1.6204 | V3 = 60.32 | L3 |
| R6 = −1.4382 | D6 = 0.005 | | | |
| R7 = 6.6702 | D7 = 0.220 | N4 = 1.7847 | V4 = 26.76 | L4 |
| R8 = 3.1350 | D8 = 0.173 | | | |
| R9 = 22.198 | D9 = 0.375 | N5 = 1.6700 | V5 = 47.11 | L5 |
| R10 = −2.822 | D10 = 0.010 | | | |
| R11 = 2.822 | D11 = 0.375 | N6 = 1.6700 | V6 = 47.11 | L6 |
| R12 = 22.198 | D12 = Variable | | | |
| R13 = 54.609 | D13 = 0.125 | N7 = 1.7618 | V7 = 26.53 | L7 |
| R14 = 2.480 | D14 = Variable | | | |
| R15 = 3.993 | D15 = 0.352 | N8 = 1.7847 | V8 = 26.76 | L8 |
| R16 = −1.652 | D16 = 0.120 | N9 = 1.6700 | V9 = 47.11 | L9 |
| R17 = 1.652 | D17 = 0.480 | | | |
| R18 = −1.299 | D18 = 0.150 | N10 = 1.7847 | V10 = 26.76 | L10 |
| R19 = −4.485 | D19 = Variable | | | |
| R20 = 10.643 | D20 = 0.513 | N11 = 1.6204 | V11 = 60.32 | L11 |
| R21 = −3.993 | D21 = 0.010 | | | |

TABLE 2-continued

Second Embodiment

| F = 1.250 | NA = 0.31 | 2w = 38 degrees | D0 = 1.500 | |
|---|---|---|---|---|
| R22 = Infinity | D22 = 0.853 | N12 = 1.5168 | V12 = 64.17 | L12 |
| R23 = −3.093 | D23 = 0.250 | N13 = 1.7059 | V13 = 30.30 | L13 |
| R24 = −4.679 | D24 = 230.0 | | | |

| Focal Length | 1.25 | 2.50 | 5.00 | 10.00 | (Imaging mode) |
|---|---|---|---|---|---|
| Variable D12 | 1.466 | 1.496 | 1.111 | 0.005 | |
| Variable D14 | 1.952 | 0.593 | 0.055 | 0.615 | |
| Variable D19 | 0.005 | 1.333 | 2.257 | 2.803 | |

| Focal Length | 0.896 | 2.1981 | 5.0834 | 10.00 | (Non-imaging mode) |
|---|---|---|---|---|---|
| Variable D12 | 3.318 | 1.990 | 1.066 | 0.005 | |
| Variable D14 | 0.100 | 0.100 | 0.100 | 0.615 | |
| Variable D19 | 0.005 | 1.334 | 2.257 | 2.803 | |

In the imaging mode case illustrated above, the distance D24 represents just over 19 feet from the nose of the luminaire to the surface to be illuminated by the luminaire (ie, a projection screen).

Figure 8A:
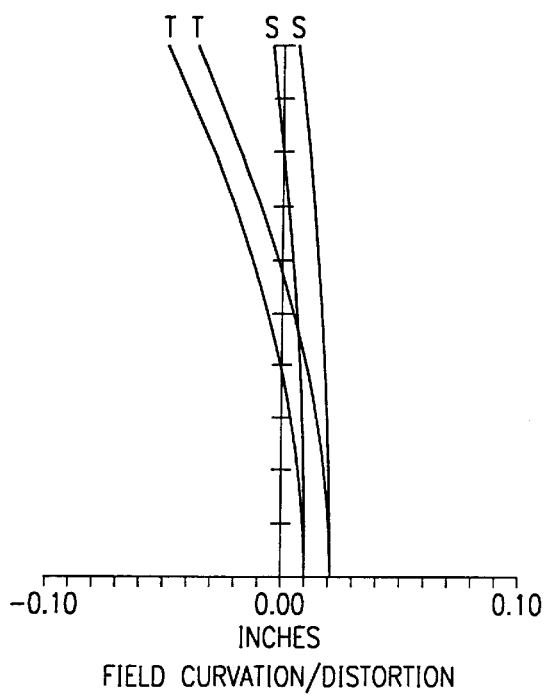
FIG. 8a–8c are a set of graphs plotting aberration curves of a zoom lens according to a second embodiment at narrow angle.
Figure 8B:
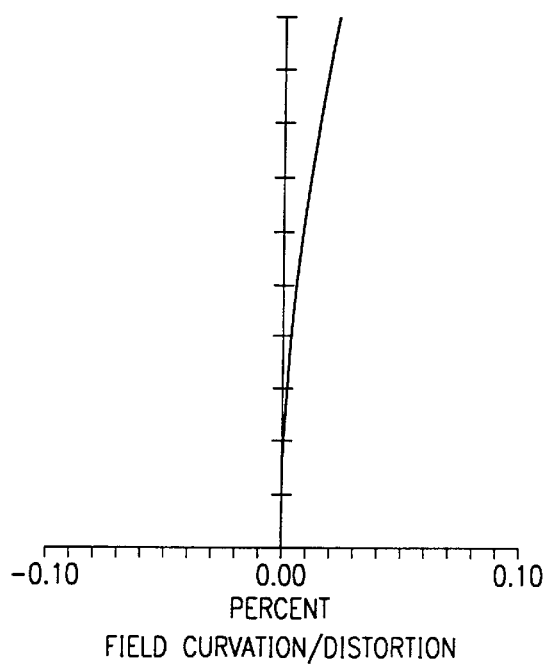
Figure 8C:
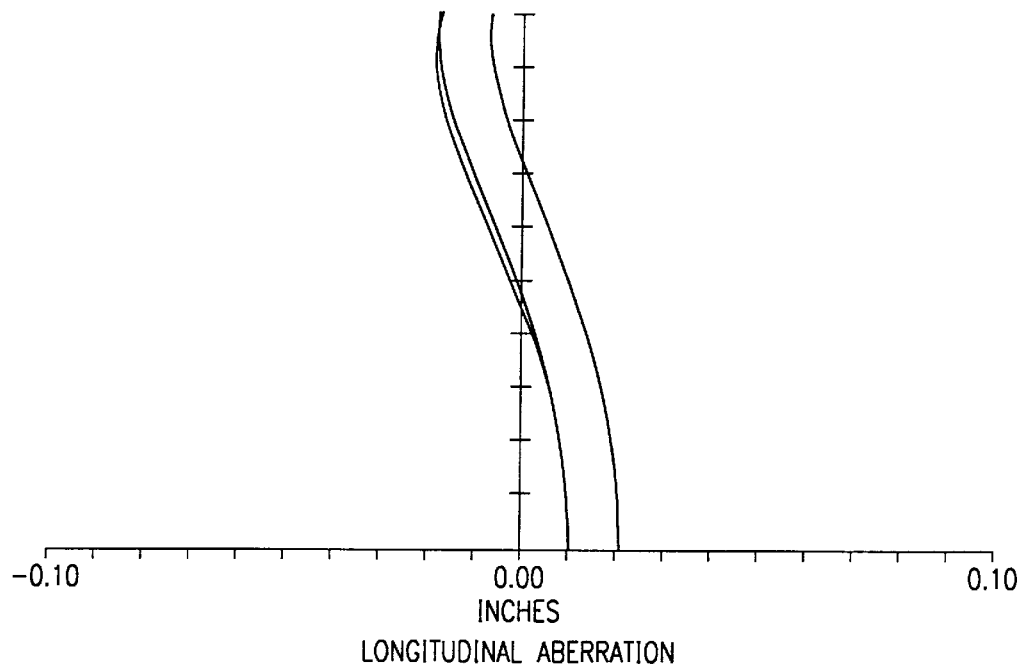

When the lens system of the second embodiment is focused at a throw length of 19 feet 2 inches, the systems yields high optical performance exhibiting aberration characteristics illustrated in FIGS. 6–8. FIG. 6a and 6b show aberration curves for the second embodiment zoom lens system at wide angle. FIG. 7a and 7b show aberration curves for the second embodiment zoom lens system at medium angle. FIG. 8a and 8b show aberration curves for the second embodiment zoom lens system at narrow angle.

The second embodiment lens system of the present invention, compared to the first embodiment, is more compact although less fast, but has better image correction, deeper focus, and provides a bigger, larger diameter projected light beam.

Satisfactory results are obtained with either of the above lens system, and may be obtained with other lens systems in which the specified valus of R, D, N, and V do not vary by more than plus or minus 20% of the values given in Table 1 or Table 2. Generally, the lens system first and second embodiments satisfy the following conditions wherein for a given ratio of Fn:Fw (where Fn=focal length at narrow angle and Fw=focal length at wide angle), a reference value $fm$ is defined as the square root of (Fw×Fn):

$$fm = \sqrt{FwFn}$$

$$0.38 < \frac{fi}{fm} < 0.71 \quad \text{(condition 1)}$$

$$-0.68 < \frac{fii}{fm} < -1.26 \quad \text{(condition 2)}$$

$$-0.37 < \frac{fiii}{fm} < -0.69 \quad \text{(condition 3)}$$

$$1.07 < \frac{fiv}{fm} < 1.98 \quad \text{(condition 4)}$$

where $fi$ is the effective focal (efl) length of Group 1, $fii$ is the efl of Group 2, $fiii$ is the efl of Group 3, and $fiv$ is the efl of Group 4.

In operation, the lens system of the present invention is useful in at least three modes of operation when mounted in a luminaire such as a stage lighting instrument. In this discussion, a beam of light has a "hard edge" characteristic when the periphery of the beam has a distinct sharpness or contrast rather than a gradual transition from illuminated area to un-lighted area. A beam of light further has a "soft edge" characteristic when the periphery of the beam has a gradual transition from illuminated area to un-lighted area. A "general illumination" usage is defined as, but not limited to, illumination which is clear of structure (no projected image) and is by default chromatically white, although color is frequently modified with a color filter system.

In general illumination, the lens system of the first and second embodiments of the present invention are operable in three modes. First mode, zooming a hard-eged beam between extremes using the lens system alone. Second mode, zooming a hard-edged beam between extremes using the lens system in combination with a variable-aperture iris. Third mode, zooming a light beam between extremes using the transition between imaging and non-imaging range of the lens system. In the first case, the lens system may perform a hard-edge zoom from either extreme-wide to extreme-narrow, or vice versa, while holding constant the aperture of a beam-size iris, and obtain a range of magnification of the projected spot of light of 8:1. In the second case, the lens system performs an 8:1 zoom of the iris aperture, in cooperation with the iris which performs a 9:1 range of aperture diameter adjustment, to obtain a range of projected spot sizes of 72:1. In the third case, a aximum range of spot sizes is obtained when the smallest spot is the smallest projected mage of the smallest iris aperture and the largest spot is the widest beam divergence angle obtained from the lens system in non-imaging mode with the iris fully open. The smallest spot must be at the smallest magnification, and must also be a sharply focused image of the iris at minimum aperture since any blurring or de-focusing will only increase the size of the spot or beam, divergence angle. A transition is made between the imaging mode, in which Group 3 (variator) controls magnification and Group 2 (compensator) controls focus, and the non-imaging mode in which the motions of the variator and compensator are decoupled from their image-mode relations and are moved linearly in fixed relationship. Linear motion of the variator and compensator in fixed relationship produces a non-linear rate of change of beam divergence angle, which is not suggested by the typical calculation of overall focal length of the lens system in the non-imaging mode.

Figure 15:
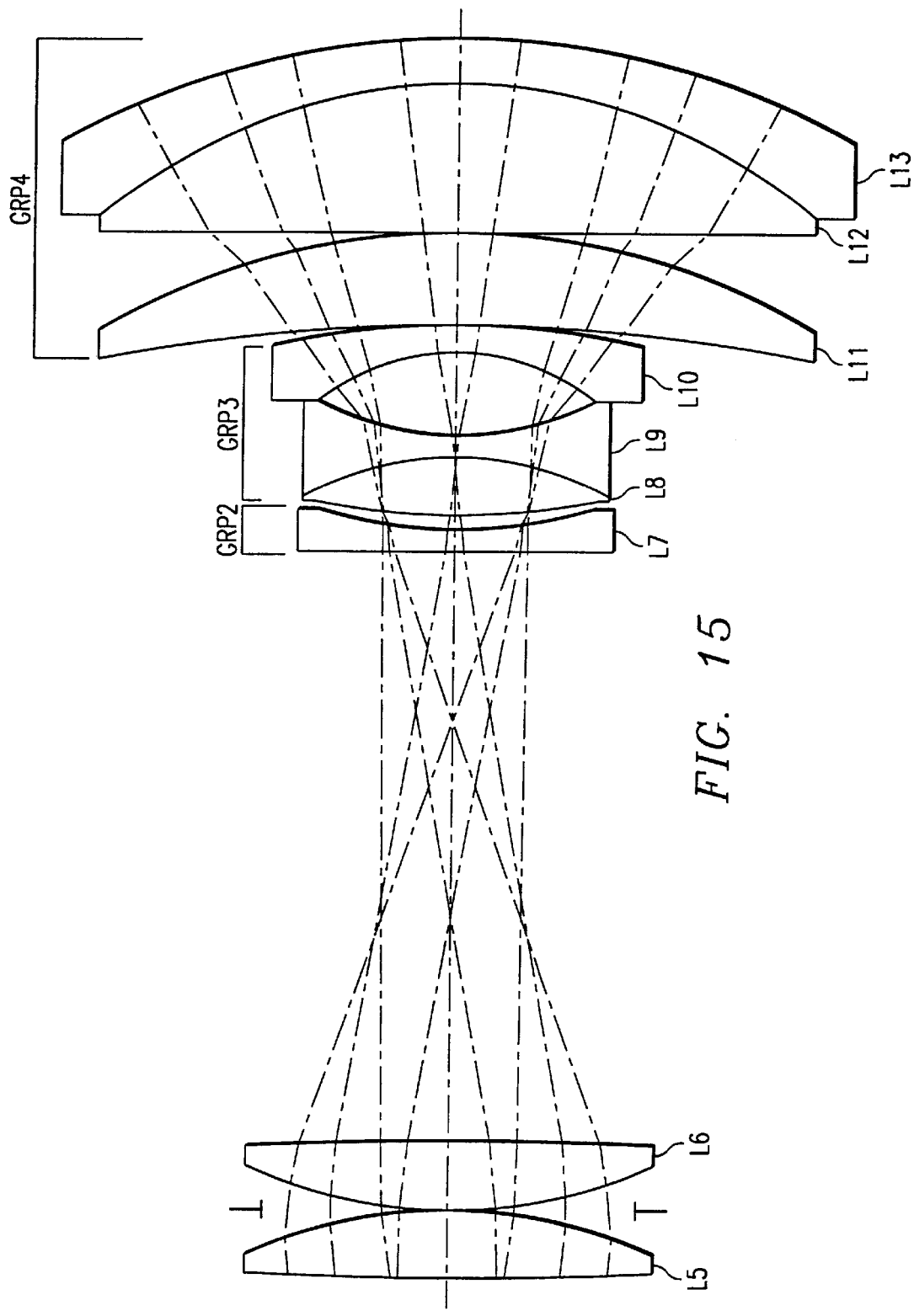
FIG. 15 is a cross-sectional view of the zoom lens system according to the second embodiment of the present invention in the non-imagining, wide-angle mode.
Figure 16A:
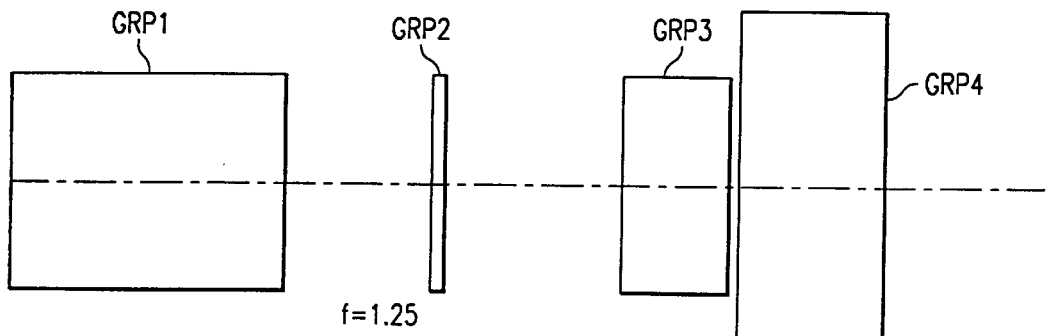
FIGS. 16A–16D illustrate the relative positions of the lens groups according to a second embodiment in an imaging mode.
Figure 16B:
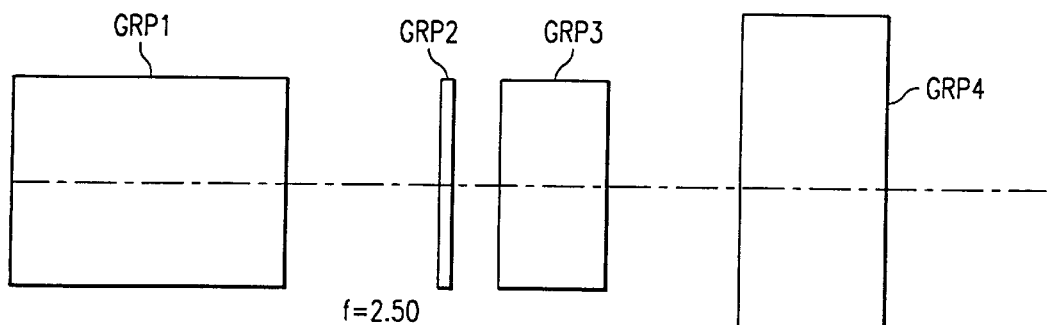
Figure 16C:
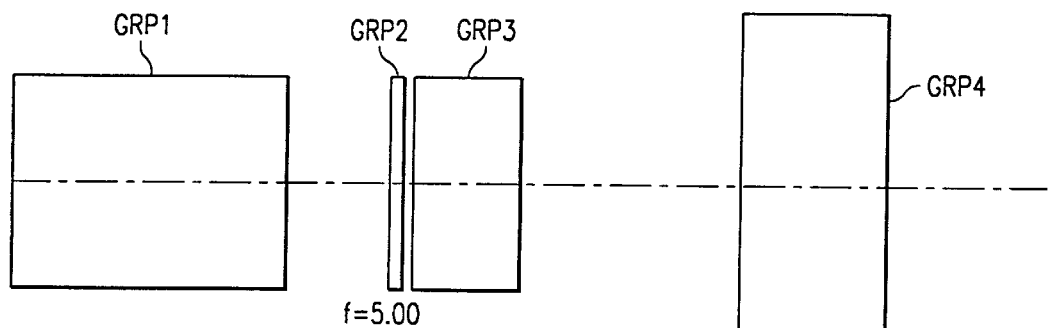
Figure 16D:
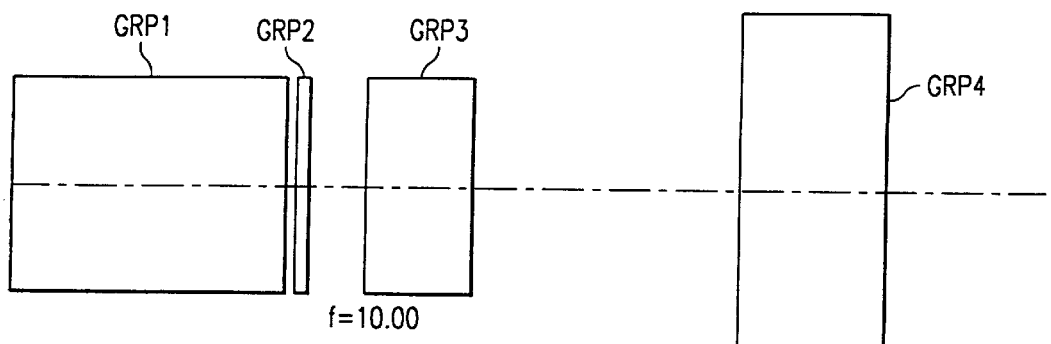
Figure 17A:
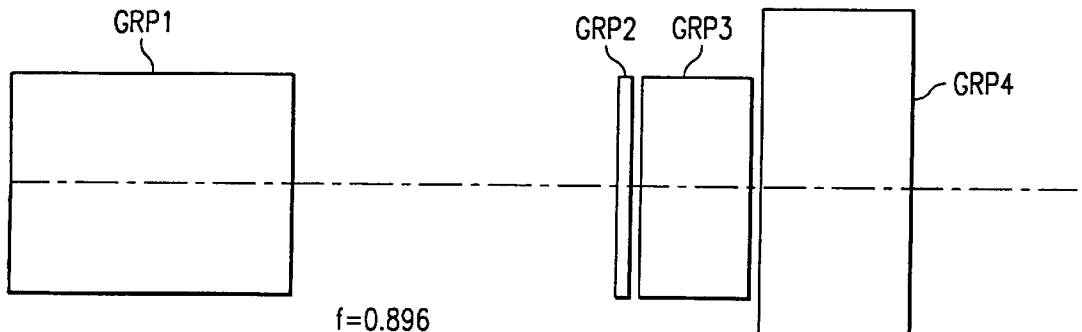
FIGS. 17A–17D illustrate the relative positions of the lens groups according to a second embodiment in an imaging mode.
Figure 17B:
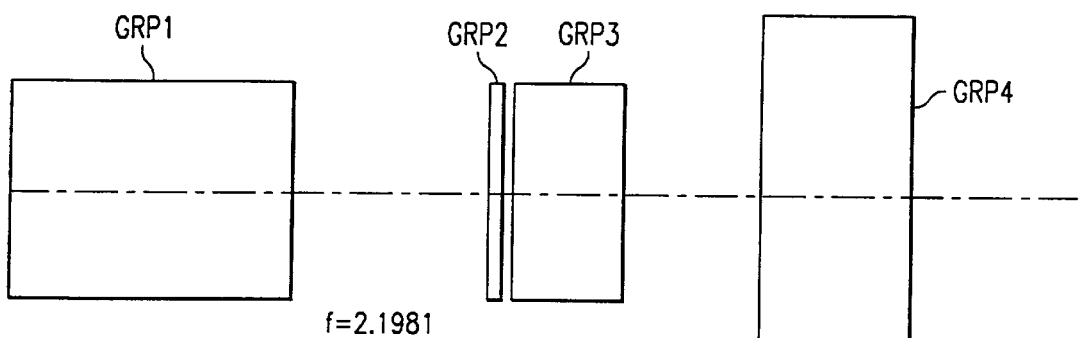
Figure 17C:
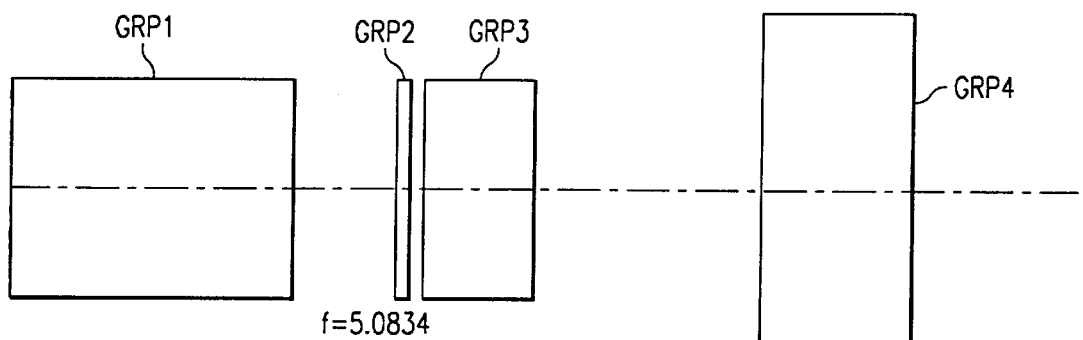
Figure 17D:
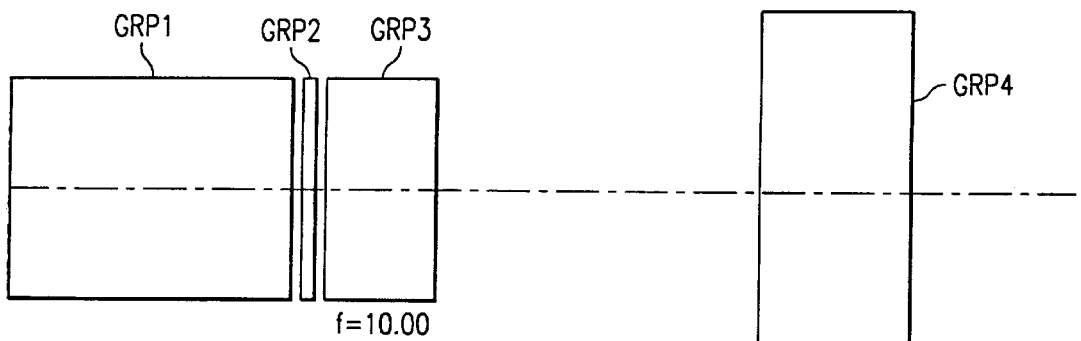

As shown in FIG. 15, Group 2 and Group 3 lenses are moved in fixed relationship towards Group 4 in accordance with Table 2 Second Embodiment in the non-imaging mode and an image is formed within Group 3. At the positions shown, the image formed within Group 3 is located forward of the primary focus of Group 4, which is to say behind Group 4 at approximately 25% of the distance to the primary focus. This condition causes rapid non-linear (wide-angle) divergence of the light beam through Group 4.

Whereas generally the zoom ratio for imaging applications is defined as the ratio of the longest focal length divided by the shortest focal length, this calculation is deceptive for non-imaging applications. The present invention make use of a non-linear beam expansion caused by the decoupling of the imaging motion table that controls the positions of Group 2 (compensator) and Group 3 (variator) into a linear movement of the Group 2 and Group 3 combination towards Group 4. During this movement, the rate of change of the beam divergence angle is very non-linear because the refracted beam is rapidly changed from a converging set of rays to an intermediate image plane located well in front of the primary focus of Group 4, causing very wide-angle refraction.

Those skilled in the art will appreciate that various substitutions, omissions, modifications and changes may be made in the method and apparatus of the present invention without departing from the scope or spirit thereof. Accordingly, it is intended that the foregoing description be considered merely exemplary of the present invention and not a limitation thereof. Therefore, the above-described embodiments are merely examples of how the invention may be carried out and other ways may also be possible which are within the scope of the following claims.

I claim:

1. In a lighting instrument having variable magnification optics, a method of operating said optics, comprising the steps of:

maintaining axial position of a projection lens group throughout;

moving an objective lens group with respect to said projection lens group to focus a light beam at a desired distance;

moving a variator lens group with respect to the objective lens group to obtain a desired magnification power;

moving a compensator lens group with respect to said variator group to obtain a desired image focus; and moving said compensator lens group in a fixed relationship with said variator lens group with respect to said objective lens group to obtain a desired magnification power irrespective of image focus.

2. A zoom lens system comprising: a first lens group having a positive refractive power, a second lens group having a negative refractive power, a third lens group having a negative refractive power, and a fourth lens group having a positive refractive power, said lens system satisfying the following conditions:

$$fm = \sqrt{FwFn}$$

$$0.38 < \frac{fi}{fm} < 0.71 \quad \text{(condition 1)}$$

$$-0.68 < \frac{fii}{fm} < -1.26 \quad \text{(condition 2)}$$

$$-0.37 < \frac{fiii}{fm} < -0.69 \quad \text{(condition 3)}$$

$$1.07 < \frac{fiv}{fm} < 1.98 \quad \text{(condition 4)}$$

where $fi$ is the effective focal (efl) length of said first lens group, $fii$ is the efl of said second group, $fiii$ is the efl of said third group, and $fiv$ is the efl of said fourth group, Fw is the efl of said lens system at a wide-angle, Fn is the efl of said lens system at a narrow angle, and $fm$ is a reference value as defined above with respect to magnification.

3. In a lighting instrument having variable magnification optics, a method of operating said optics, comprising the steps of:

during an imaging mode:

moving an objective lens group with respect to a projection lens group to focus a light beam at a desired distance;

moving a variator lens group with respect to the objective lens group to obtain a desired magnification power; and moving a compensator lens group with respect to said variator lens group to obtain a desired image focus; and during a non-imaging mode:

moving the compensator lens group in a fixed relationship with the variator lens group with respect to the objective lens group to obtain a desired magnification power irrespective of image focus.

4. In a lighting instrument for illumination purposes having variable magnification optics, a method of operating said optics, comprising the steps of:

during an imaging mode, controlling the optics to obtain a first magnification range through which a projected image is maintained in focus; and during a non-imaging mode, controlling the optics to obtain a second magnification range, greater than the first magnification range, through which the projected image is magnified irrespective of image focus.

5. In the lighting instrument as described in claim 4 wherein the variable magnification optics comprise:

an objective lens group having positive refractive power;

a compensator lens group having negative refractive power;

a variator lens group having negative refractive power; and a projection lens group having positive refractive power.

6. In the lighting instrument as described in claim 5 wherein, during the imaging mode, the variator lens group is moved relative to the objective lens group to obtain a desired magnification power within the first magnification range and the compensator lens group is moved relative to the variator lens group to maintain the projected image in focus.

7. In the lighting instrument as described in claim 5 wherein, during the non-imaging mode, the compensator lens group is in a fixed relationship with the variator lens group and the compensator lens group and variator lens group together are moved with respect to the objective lens group to obtain a desired magnification power within the second magnification range irrespective of image focus.

8. A lighting instrument for illumination purposes, comprising:

a lamp coupled with a reflector to project a beam of light that illuminates an object;

a lens system comprising variable magnification optics; and control means operative:

(a) during an imaging mode, for controlling the variable magnification optics to obtain a first magnification range through which a projected image is maintained in focus, and (b) during an non-imaging mode, for controlling the optics to obtain a second magnification range, greater than the first magnification range, through which the projected image is magnified irrespective of image focus.

9. The lighting instrument as described in claim 8 wherein the variable magnification optics comprise:

an objective lens group having positive refractive power;

a compensator lens group having negative refractive power;

a variator lens group having negative refractive power; and a projection lens group having positive refractive power.

10. The lighting instrument as described in claim 9 wherein, during the imaging mode, the control means moves the variator lens group relative to the objective lens group to obtain a desired magnification power within the first magnification range and the control means moves the compensator lens group relative to the variator lens group to maintain the projected image in focus.

11. The lighting instrument as described in claim 9 wherein, during the non-imaging mode, the compensator lens group is in a fixed relationship with the variator lens group and the control means moves the compensator lens group and variator lens group together with respect to the objective lens group to obtain a desired magnification power within the second magnification range irrespective of image focus.

12. The lighting instrument as described in claim 8 wherein the instrument is a stage light.

13. The lighting instrument as described in claim 12 wherein the stage light is used as a spot light during the imaging mode and a wash light during the non-imaging mode.

14. The lighting instrument as described in claim 8 wherein the instrument is an architectural light.

15. A stage lighting instrument having a projection lens system in which said lens system includes a plurality of lens elements arranged in exactly four groups, wherein three variable air spaces are provided between said groups.

16. A stage lighting instrument as in claim 15 wherein the four groups arranged sequentially from an object side to an image side comprise:

a first group having positive refractive power;
a second group having negative refractive power;
a third group having negative refractive power; and
a fourth group having positive refractive power.

* * * * *